(12) United States Patent
Lee et al.

(10) Patent No.: US 11,989,064 B2
(45) Date of Patent: May 21, 2024

(54) ELECTRONIC DEVICE

(71) Applicant: SAMSUNG ELECTRONICS CO., LTD., Suwon-si (KR)

(72) Inventors: Muyeol Lee, Suwon-si (KR); Ganghyun Goo, Suwon-si (KR); Jinwan An, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 17/861,461

(22) Filed: Jul. 11, 2022

(65) Prior Publication Data

US 2023/0010760 A1 Jan. 12, 2023

Related U.S. Application Data

(63) Continuation of application No. PCT/KR2022/008278, filed on Jun. 13, 2022.

(30) Foreign Application Priority Data

Jul. 7, 2021 (KR) .................. 10-2021-0089190

(51) Int. Cl.
*G06F 1/16* (2006.01)
*H04M 1/02* (2006.01)

(52) U.S. Cl.
CPC .......... *G06F 1/1656* (2013.01); *G06F 1/1624* (2013.01); *G06F 1/1652* (2013.01); *H04M 1/0235* (2013.01); *H04M 1/0268* (2013.01); *H04M 2201/38* (2013.01)

(58) Field of Classification Search
CPC ..... G06F 1/1624; G06F 1/1652; G06F 1/1656
See application file for complete search history.

(56) References Cited

U.S. PATENT DOCUMENTS

| | | | |
|---|---|---|---|
| 9,293,111 | B2 | 3/2016 | Kwack et al. |
| 10,319,291 | B2* | 6/2019 | Ikeda ............... G09F 9/301 |
| 2013/0314387 | A1 | 11/2013 | Kwack et al. |
| 2018/0067521 | A1* | 3/2018 | Browning ......... G06F 1/1622 |
| 2019/0297175 | A1 | 9/2019 | Lin et al. |
| 2019/0384438 | A1 | 12/2019 | Park et al. |

(Continued)

FOREIGN PATENT DOCUMENTS

| | | |
|---|---|---|
| CN | 111145649 | 5/2020 |
| CN | 111161635 | 5/2020 |

(Continued)

*Primary Examiner* — Adrian S Wilson
(74) *Attorney, Agent, or Firm* — Nixon & Vanderhye, P.C.

(57) ABSTRACT

An electronic device including a detection sensor is disclosed. The electronic device may include: a housing structure including a first housing and a second housing movably coupled to the first housing in a moving direction, a flexible display supported by the first housing and the second housing, and having a size of a display area visible at a front surface of the housing structure configured to change based on relative movement by the second housing with respect to the first housing, a detection sensor including a first electrode and a second electrode disposed side by side, and a dielectric disposed between the first electrode and the second electrode, and configured to detect a change in the size of the display area, and a processor.

20 Claims, 18 Drawing Sheets

(56) References Cited

U.S. PATENT DOCUMENTS

2020/0117243 A1* 4/2020 Browning ............. G06F 1/1652
2020/0409421 A1* 12/2020 Cho ....................... H10K 59/40

FOREIGN PATENT DOCUMENTS

| | | |
|---|---|---|
| JP | 5662753 | 2/2015 |
| KR | 10-0623702 | 9/2006 |
| KR | 10-2017-0025086 | 3/2017 |
| KR | 10-2018-0014386 | 2/2018 |
| KR | 10-2019-0101184 | 8/2019 |
| KR | 10-2019-0113128 | 10/2019 |
| KR | 10-2047690 | 11/2019 |
| KR | 10-2070244 | 1/2020 |
| KR | 10-2139530 | 7/2020 |
| KR | 10-2148980 | 8/2020 |
| KR | 10-2256681 | 5/2021 |

* cited by examiner

ELECTRONIC DEVICE

CROSS-REFERENCE TO RELATED APPLICATIONS

This application is a continuation of International Application No. PCT/KR2022/008278 designating the United States, filed on Jun. 13, 2022, in the Korean Intellectual Property Receiving Office and claiming priority to Korean Patent Application No. 10-2021-0089190, filed on Jul. 7, 2021, in the Korean Intellectual Property Office, the disclosures of which are incorporated by reference herein in their entireties.

BACKGROUND

1. Field

The disclosure relates to an electronic device according to various example embodiments.

2. Description of Related Art

An electronic device of which a size of a display exposed to the outside changes depending on a using state has been developed. For example, an exposed area of a display of a slidable electronic device may change based on an operation. In case of a device of which an exposed area of a display changes, various sensing methods are used for detecting the exposed area of the display to display an appropriate visual image corresponding to the exposed area of the display.

An electronic device including a slidable display, of which a size of a display area exposed to an outside changes based on an operation by a housing, may use various sensing methods of detecting the size of the exposed area of the display, for example, sensing methods using an encoder, a magnet, and a sensor. Since the sensor configured to detect the size of the exposed area of the display occupies an internal space of the electronic device, the space efficiency of the electronic device may be improved by minimizing a space for mounting the sensor. In addition, since the electronic device includes an outlet region for inserting or withdrawing the display, various methods of preventing moisture inflow into the outlet region may be used.

SUMMARY

Embodiments of the disclosure provide an electronic device with a flexible display in which, through a detection sensor disposed in a region where a flexible display is inserted into or withdrawn from, a display area, which is exposed (e.g., visible) to an outside, of the flexible display may be intuitively detected.

Embodiments of the disclosure provide an electronic device with a flexible display in which an erroneous operation of an electronic device caused by an external signal may be prevented and/or reduced by forming the detection sensor to have a unique pattern.

Embodiments of the disclosure provide an electronic device with a flexible display in which a submersion of an electronic device may be prevented and/or reduced at an early stage and damage caused by the submersion of the electronic device may be minimized and/or reduce by detecting a sensor value, which varies based on moisture inflow, obtained by a detection sensor.

Example embodiments of the disclosure may provide an electronic device including: a housing structure including a first housing, a second housing movably coupled to the first housing in a moving direction; a flexible display supported by the first housing and the second housing, and having a size of a display area visible at a front surface of the housing structure configured to change based on relative movement by the second housing with respect to the first housing; a detection sensor including a first electrode and a second electrode, disposed side by side, and a dielectric disposed between the first electrode and the second electrode, and configured to detect a change in the size of the display area; and a processor, and wherein the housing structure may include: an outlet, through which the flexible display is configured to be withdrawn from an internal space to the front surface of the housing structure or in which the flexible display is inserted from the front surface to the internal space, on the front surface of the housing structure, the detection sensor may be disposed on a part of the housing structure, adjacent to the outlet, wherein the first electrode faces a surface of the flexible display passing through the outlet, and the detection sensor may include a first portion having a length direction, and one or more second portions protruding from the first portion to one direction.

Example embodiments of the disclosure may provide an electronic device including: a first housing; a second housing at least a portion of which partially overlaps with the first housing, and is movably coupled to the first housing in a moving direction; a flexible display having at least a portion mounted to a surface of the second housing, at least another portion is accommodated in an internal space formed by the first housing, and a size of a display area visible through surfaces of the first housing and the second housing is configured to change based on relative movement by the second housing with respect to the first housing; a detection sensor having a capacitance configured to change based on a degree of moisture inflow, and including a first electrode, a second electrode, and a dielectric disposed between the first electrode and the second electrode; and a processor, and wherein the first housing may include an outlet through which the flexible display is configured to be withdrawn from the internal space to the surface of the first housing or the second housing, or the flexible display is configured to be inserted to the internal space from the surface, the detection sensor may be disposed on an inner surface of the first housing adjacent to the outlet, and the processor may be configured to determine the degree of moisture inflow into the internal space based on a change of a capacitance value generated by the detection sensor.

Example embodiments of the disclosure may provide a method of controlling a display screen of an electronic device, the method including: detecting insertion or withdrawal of a display through an outlet; detecting a detection sensor through the display; determining whether a detected pattern of the detection sensor matches a specified pattern of the detection sensor; based on the detected pattern of the detection sensor matching the specified pattern of the detection sensor, identifying an area in which the detection sensor is detected on the display; calculating a size of a display area of the display visible to the outside based on the identified detection sensor detecting area of the display; and displaying visual information corresponding to the calculated size of the display area of the display.

According to various example embodiments, a size of a display area of a flexible display may be accurately detected by applying a signal to an inserting and withdrawing region of the flexible display through a detection sensor disposed on the outlet of a housing structure.

According to various example embodiments, misrecognition of a signal may be prevented and/or reduced by a detection sensor which has a unique shape to secure visibility of a signal pattern of the detection sensor.

According to various example embodiments, submersion of an electronic device may be prevented and/or reduced at an early stage and damage caused by the submersion of the electronic device may be minimized and/or reduced by detecting a senor value, which varies based on moisture inflow, obtained by a detection sensor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
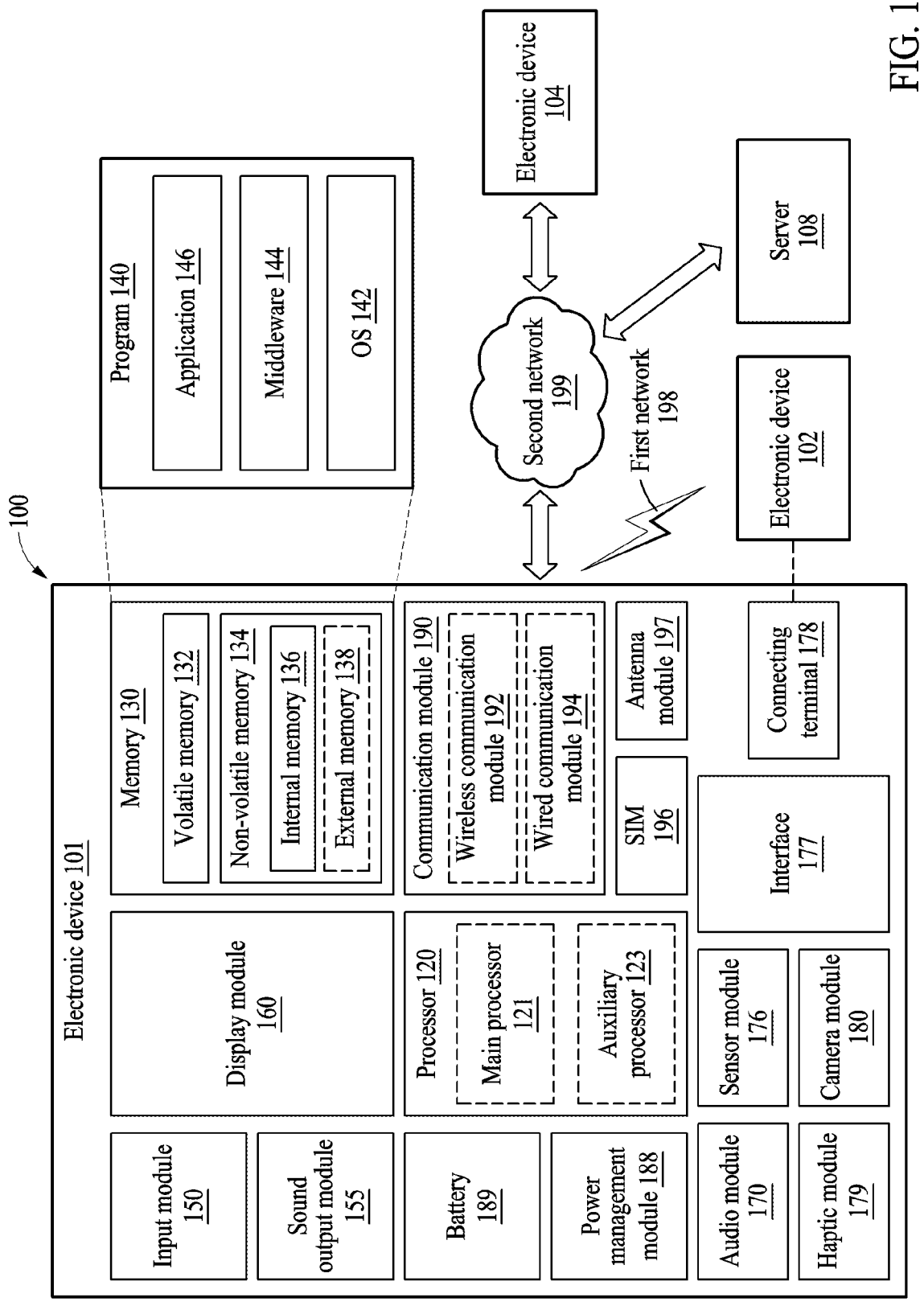
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may be omitted.

FIG. 1 is a block diagram illustrating an example electronic device in a network environment according to various embodiments. Referring to FIG. 1, an electronic device 101 in a network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added to the electronic device 101. In various example embodiments, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 connected to the processor 120, and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to perform a specific function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121, while the main processor 121 is in an inactive (e.g., sleep) state, or along with the main processor 121, while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by touch.

The audio module 170 may convert sound into an electrical signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electrical signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that operate independently of the processor 120 (e.g., an AP) and support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with an external electronic device (e.g., the electronic device 104), via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network following a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance in a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and an external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the components described above may be coupled mutually and exchange signals (e.g., commands or data) therebetween via an inter-peripheral communication scheme (e.g., a bus, a general purpose input and output (GPIO), a serial peripheral interface (SPI), or a mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the components described above may include a single entity or multiple entities, and some of the multiple entities may be separately disposed in different components. According to various example embodiments, one or more of the components described above may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
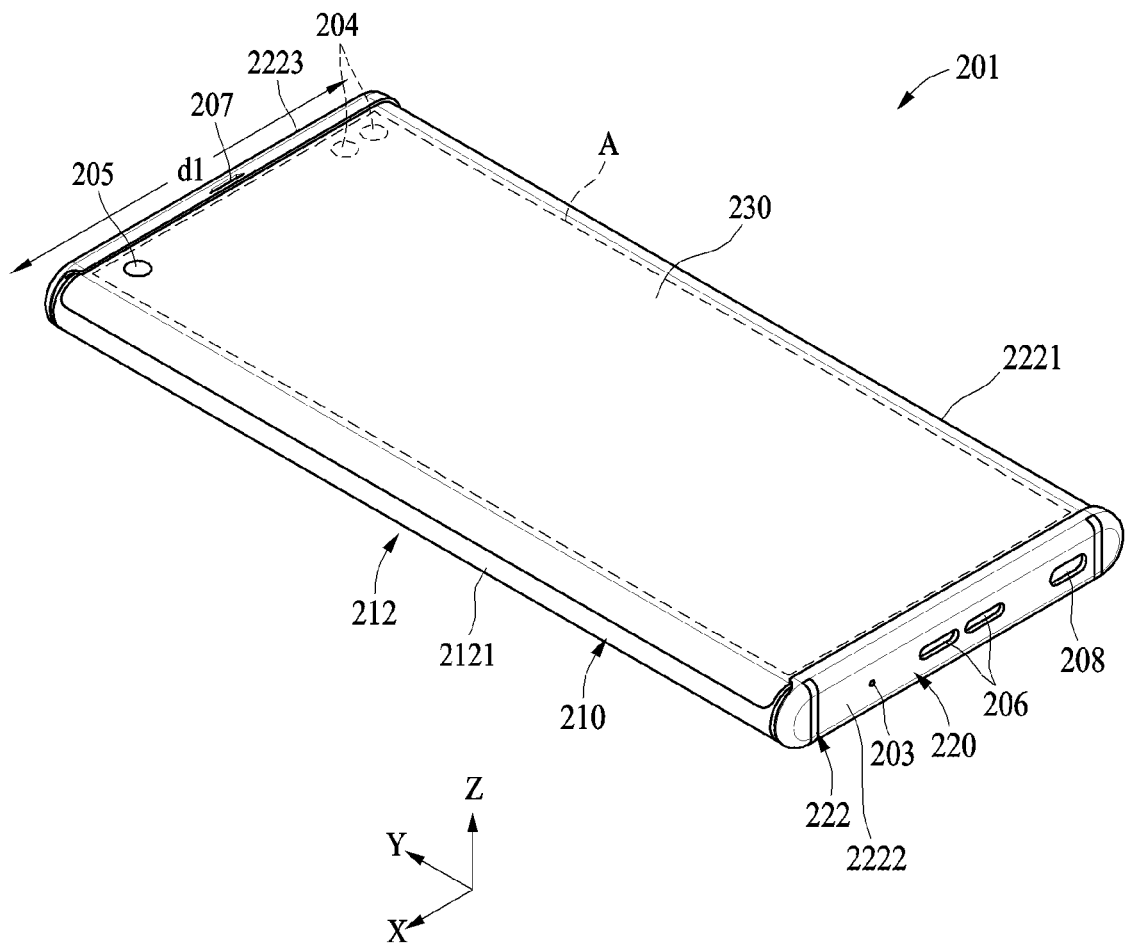
FIG. 2A is a front perspective view illustrating an electronic device in a closed state according to various embodiments.
Figure 2B:
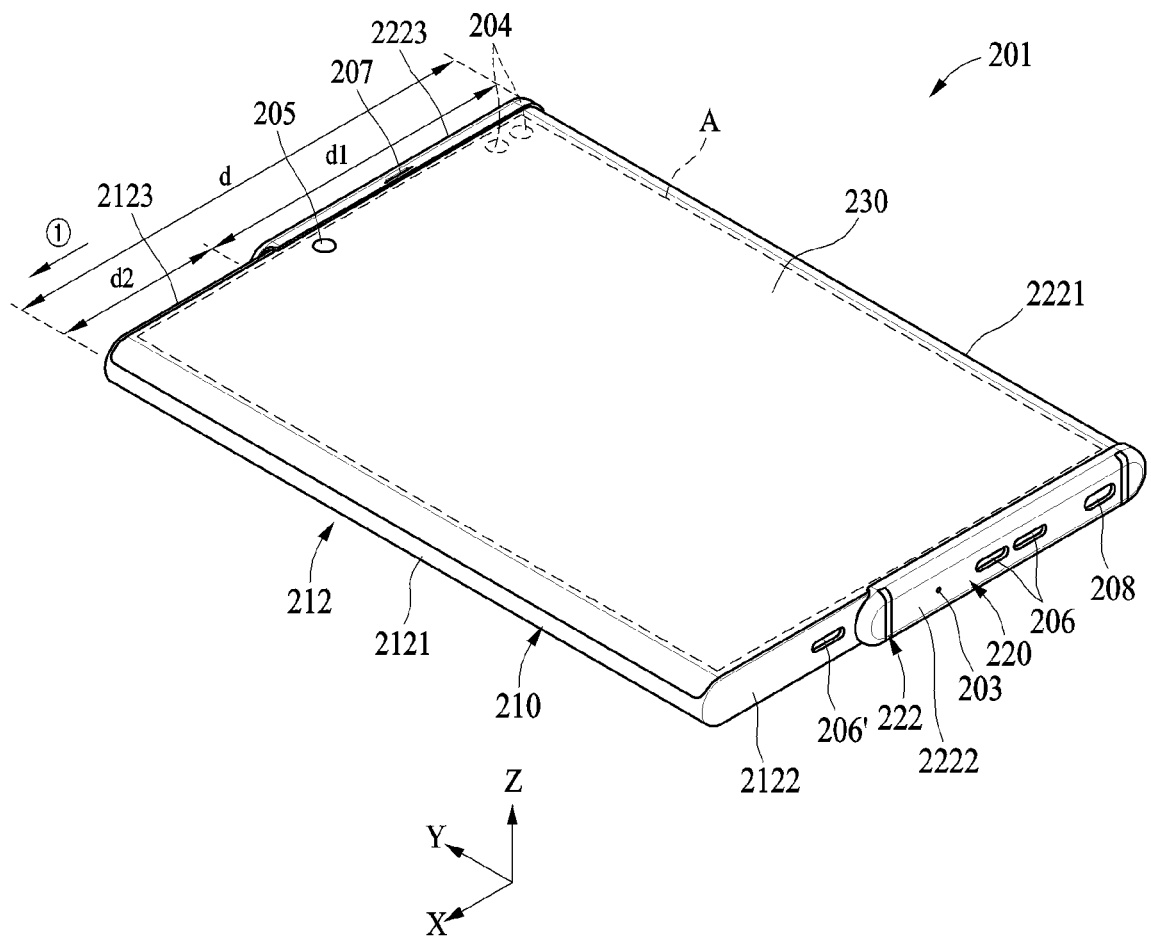
FIG. 2B is a front perspective view of the electronic device in an open state according to various embodiments.
Figure 3A:
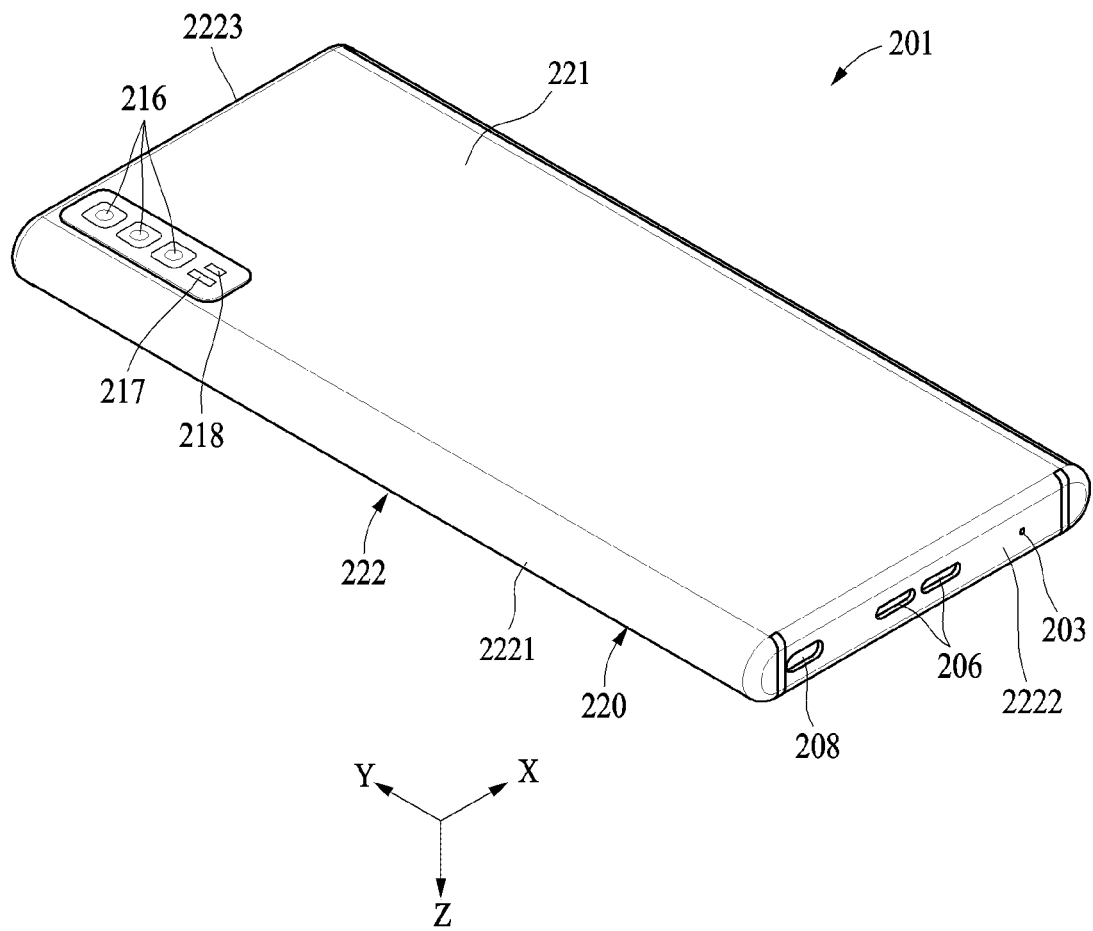
FIG. 3A is a rear perspective view illustrating the electronic device in a closed state according to various embodiments.
Figure 3B:
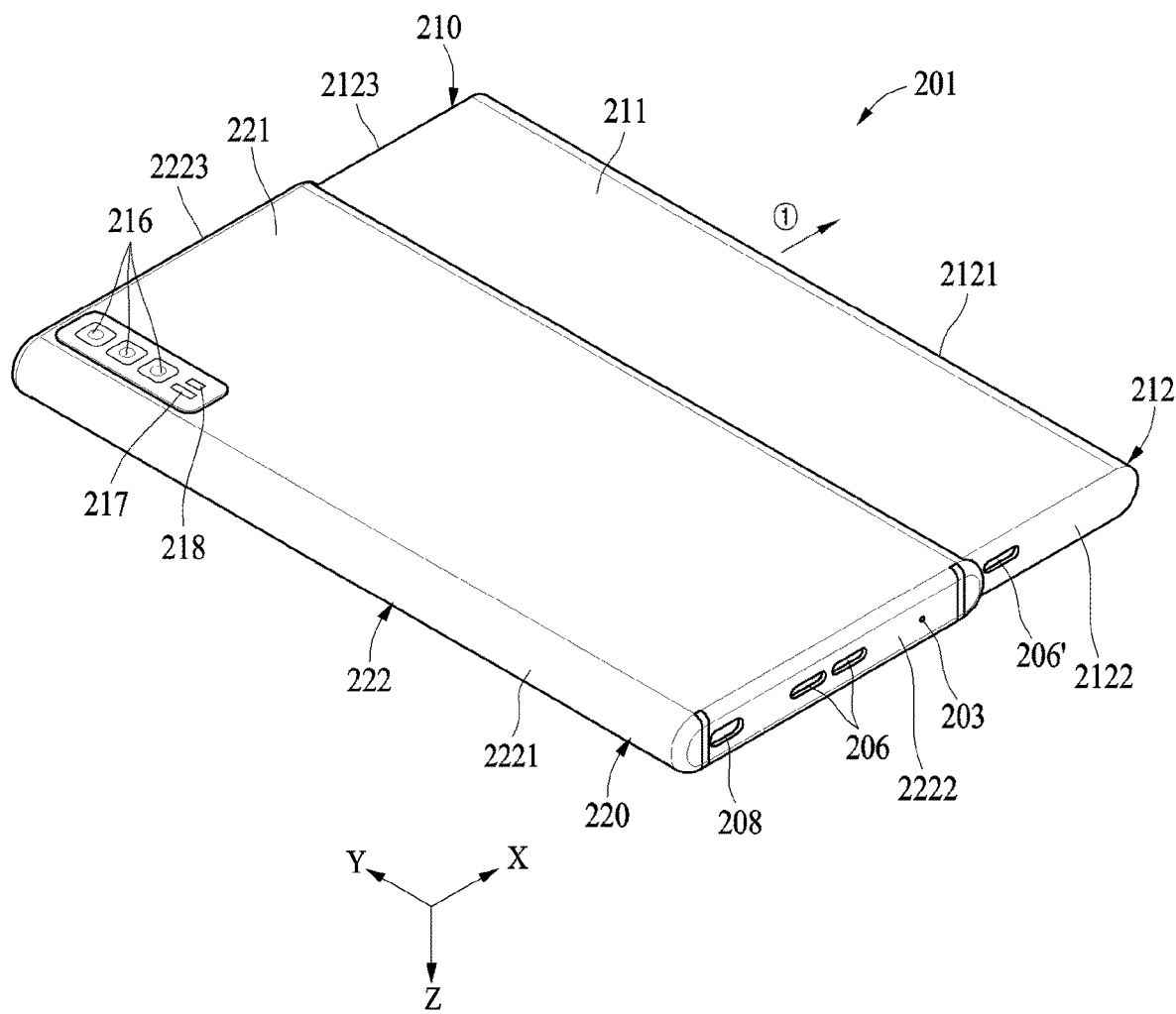
FIG. 3B is a rear perspective view illustrating the electronic device in an open state according to various embodiments.

FIG. 2A is a front perspective view of an electronic device in a closed state according to various embodiments, and FIG. 2B is a front perspective view of the electronic device in an open state, according to various embodiments. FIG. 3A is a rear perspective view of the electronic device in a closed state according to various embodiments, and FIG. 3B is a rear perspective view of the electronic device in an open state, according to various embodiments.

An electronic device 201 of FIG. 2A may be at least partially similar to the electronic device 101 of FIG. 1, or may further include other example embodiments of an electronic device.

Referring to FIGS. 2A to 3B, the electronic device 201 according to various example embodiments may include a housing structure including a first housing 210 and a second housing 220 that is at least partially and movably coupled to the first housing 210. According to an example embodiment, the first housing 210 may include a first plate 211 and a first side frame 212 that extends in a substantially vertical direction (e.g., a z-axis direction) along an edge of the first plate 211. According to an example embodiment, the first side frame 212 may include a first side surface 2121, a second side surface 2122 extending from one end of the first side surface 2121, and a third side surface 2123 extending from the other end of the first side surface 2121. According to an example embodiment, the first housing 210 may include a first space that is at least partially closed from the outside by the first plate 211 and the first side frame 212.

According to various example embodiments, the second housing 220 may include a second plate 221 and a second side frame 222 that extends in a substantially vertical direction (e.g., the z-axis direction) along an edge of the second plate 221. According to an example embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. In an example, the fourth side surface 2221 may extend from a structure other than the second plate 221 and may also be coupled to the second plate 221. According to an example embodiment, the second housing 220 may include a second space that is at least partially closed from the outside by the second plate 221 and the second side frame 222. According to an example embodiment, the first plate 211 and the second plate 221 may be disposed to at least partially form a rear surface of the electronic device 201. For example, the first plate 211, the second plate 221, the first side frame 212, and the second side frame 222 may be formed of, for example, a polymer, coated or colored glass, ceramic, metal (e.g., aluminum, stainless steel (STS), or magnesium), or a combination of two or more of the above materials.

According to various example embodiments, the electronic device 201 may include a flexible display 230 disposed to be supported by the first housing 210 and the second housing 220. According to an example embodiment, the flexible display 230 may include a flat portion supported by the second housing 220, and a bendable portion extending from the flat portion and supported by the first housing 210. According to an example embodiment, the bendable portion of the flexible display 230 may be disposed in the first space of the first housing 210 not to be exposed or visible (as used herein, the terms "exposed" and "visually exposed" when used with respect to describing the flexible display may be used interchangeably with the term "visible" to indicate a degree to which the flexible display is disposed within the housing and a degree to which the flexible display is extended outside of the housing) to the outside when the electronic device 201 is closed, and may be exposed or visible to the outside to extend from the flat portion while being supported by the first housing 210 when the electronic device 201 is open. Accordingly, the electronic device 201 may be a rollable electronic device in which a display screen of the flexible display 230 is expanded in response to an open operation according to a movement of the first housing 210 from the second housing 220.

According to various example embodiments, in the electronic device 201, the first housing 210 may be at least partially inserted into the second space of the second housing 220, and may be coupled to the second housing 220 to be movable in direction ①. For example, in the closed state, the electronic device 201 may be maintained in a state in which the first housing 210 and the second housing 220 are coupled each other such that a distance between the first side surface 2121 and the fourth side surface 2221 is a first distance d1. According to an example embodiment, in the open state, the electronic device 201 may be maintained in a state in which the first housing 210 protrudes from the second housing 220 to have a second interval distance d in which the first side surface 2121 protrudes from the fourth side surface 2221 by a predetermined distance d2. According to an example embodiment, the flexible display 230 may be supported by the first housing 210 and/or the second housing 220 such that both edges thereof are curved, in the open state.

According to various example embodiments, the electronic device 201 may automatically transition between the open state and the closed state by a driving unit disposed in the first space and/or the second space. For example, a processor (e.g., the processor 120 of FIG. 1) of the electronic device 201 may be configured to control an operation of the first housing 210 using the driving unit when an event for a transition between the open state and the closed state of the electronic device 201 is detected. In another example, the first housing 210 may manually protrude from the second housing 220 through a user's manipulation. In this case, the first housing 210 may protrude by a protrusion amount desired by the user, and thus, display sizes of a screen of the flexible display 230 may vary. Accordingly, the processor (e.g., the processor 120 of FIG. 1) of the electronic device 201 may display an object in various ways corresponding to a display area corresponding to a predetermined protrusion amount of the first housing 210, and may control execution of an application program.

According to various example embodiments, the electronic device 201 may include at least one of an input device 203, sound output devices 206 and 207, sensor modules 204 and 217, camera devices 205 and 216, a connector port 208, a key input device (not illustrated), or an indicator (not illustrated). In another example embodiment, at least one of the components described above of the electronic device 201 may be omitted, or the electronic device 201 may further include other components.

According to various example embodiments, the input device 203 may include a microphone 203. In some example embodiments, the input device 203 may include a plurality of microphones 203 arranged to sense a direction of sound. The sound output device 206 and 207 may include an external speaker 206 and a phone call receiver 207. In an example embodiment, when an external speaker 206 is disposed in the first housing 210, sound may be output through a hole of speaker 206 formed in the second housing 220 in the closed state. According to an example embodiment, the microphone 203 and the connector port 208 may also be formed to have substantially the same configuration. In an example embodiment, the sound output devices 206 and 207 may include a speaker (e.g., a piezo speaker) that operates without a separate speaker hole 206.

According to various example embodiments, the sensor modules 204 and 217 may generate an electrical signal or a data value corresponding to an internal operating state of the electronic device 201 or an external environmental state. The sensor modules 204 and 217 may include, for example, a first sensor module 204 (e.g., a proximity sensor or an illuminance sensor) disposed on a front surface of the second housing 220, and/or a second sensor module 217 (e.g., a heart rate monitoring (HRM) sensor) disposed on a rear surface of the second housing 220. According to an example embodiment, the first sensor module 204 may be disposed below the flexible display 230 in the second housing 220. According to an example embodiment, the first sensor module 204 may further include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to various example embodiments, the camera devices 205 and 216 may include a first camera device 205 disposed on the front surface of the second housing 220 of the electronic device 201, and a second camera device 216 disposed on the rear surface of the second housing 220. According to an example embodiment, the electronic device 201 may include a flash 218 located near the second camera device 216. According to an example embodiment, the camera devices 205 and 216 may include one or more lenses, an image sensor, and/or an ISP. According to an example embodiment, the first camera device 205 may be disposed under the flexible display 230, and may be configured to capture an object through a portion of an active area of the flexible display 230. According to an example embodiment, the flash 218 may include, for example, a light-emitting diode (LED) or a xenon lamp. In some example embodiments, two or more lenses (e.g., a wide-angle lens and a telephoto lens) and image sensors may be disposed on one surface of the electronic device 201.

According to various example embodiments, the electronic device 201 may include at least one antenna (not shown). According to an example embodiment, the at least one antenna may wirelessly communicate with an external electronic device (e.g., the electronic device 104 of FIG. 1), or may wirelessly transmit and receive power required for charging. According to an example embodiment, the antenna may include a legacy antenna, a mmWave antenna, a near field communication (NFC) antenna, a wireless charging antenna, and/or a magnetic secure transmission (MST) antenna. In an example embodiment, an antenna structure may be formed through at least a portion of the first side frame 212 and/or the second side frame 222, which are formed of metal.

For convenience of description, FIGS. 2A and 3B illustrate an example in which an area of the flexible display 230 exposed (e.g., visible) to the outside of the electronic device 201 expands in a −x-axis direction (e.g., a left direction), however a direction in which the flexible display 230 of the electronic device 201 expands is not limited thereto. In an example embodiment, the electronic device 201 may operate such that an area of the flexible display 230 exposed (e.g., visible) to the outside expands in a +x-axis direction (e.g., a right direction), a +y-axis direction (e.g., an up direction), or a −y-axis direction (e.g., a down direction). In case the area of the flexible display 230 exposed (e.g., visible) to the outside expands in a horizontal direction (e.g., the x-axis direction) or a vertical direction (e.g., the y-axis direction), the area thereof may expand in one direction or various directions. For example, in case the electronic device 201 operates such that the flexible display 230 exposed (e.g., visible) to the outside expands in the x-axis direction (e.g., a left direction or a right direction), the flexible display 230 may expand in any of the −x-axis direction (e.g., the left direction) or the +x-axis direction (e.g., the right direction), or may expand both in the −x-axis direction and the +x-axis direction. In addition, in case the electronic device 201 operates such that the flexible display 230 expands in the vertical direction (e.g., the y-axis direction), the flexible display 230 may expand in any of the up direction (e.g. the +y-axis direction) or the down direction (e.g., the −y-axis direction), or may expand in both of the up direction and the down direction. Although various example embodiments will be described below under the assumption that the flexible display 230 expands in the −x-axis direction for convenience of description, an implementation method of each example embodiment is not limited thereto.

Figure 4A:
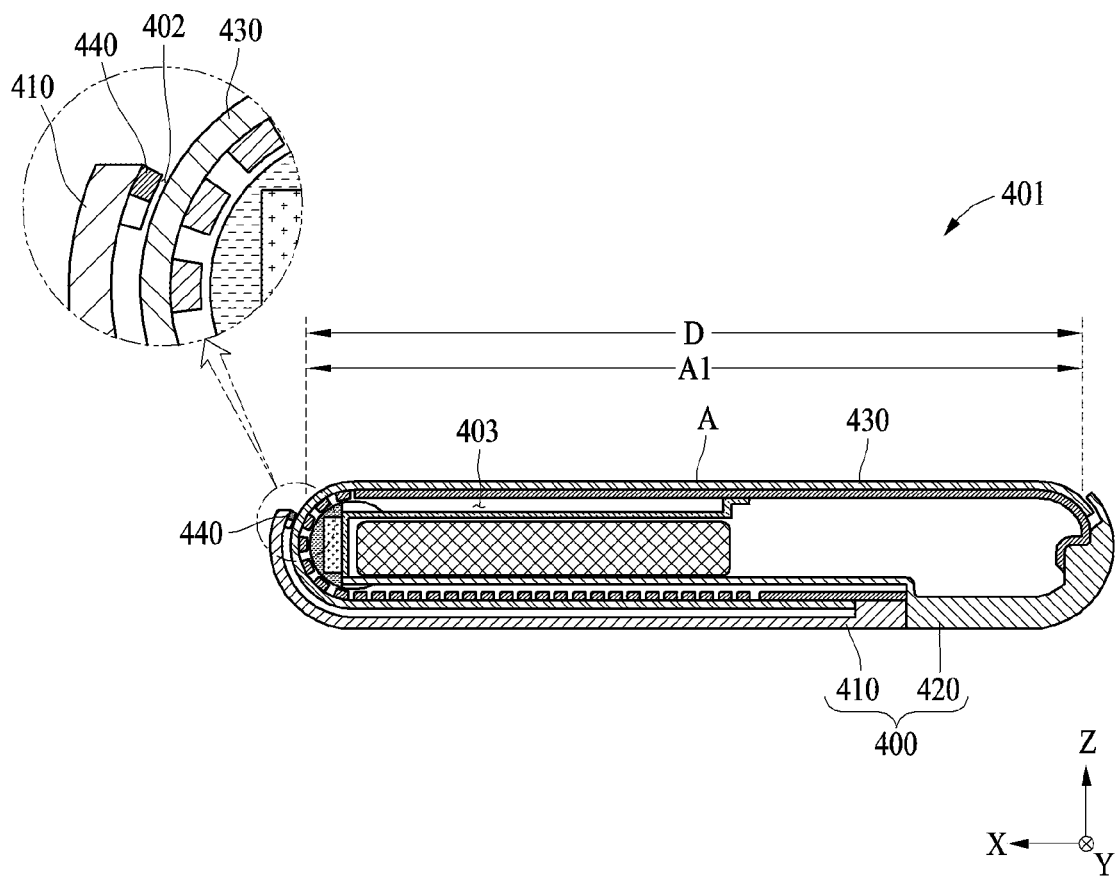
FIG. 4A is a cross-sectional view of an electronic device in a first state according to various embodiments.
Figure 4B:
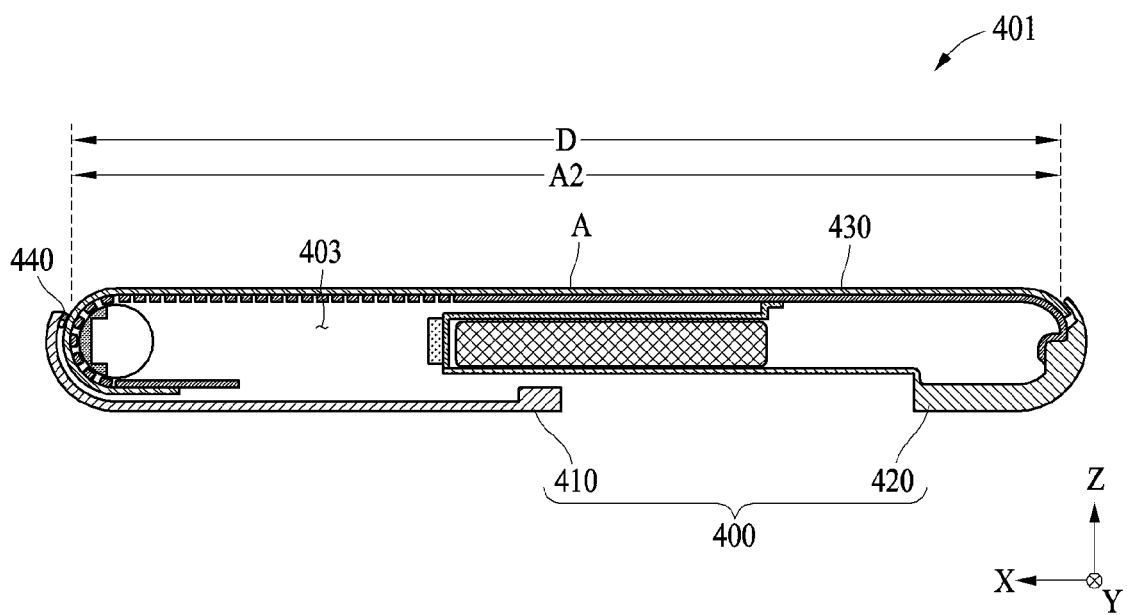
FIG. 4B is a cross-sectional view of the electronic device in a second state according to various embodiments.
Figure 5A:
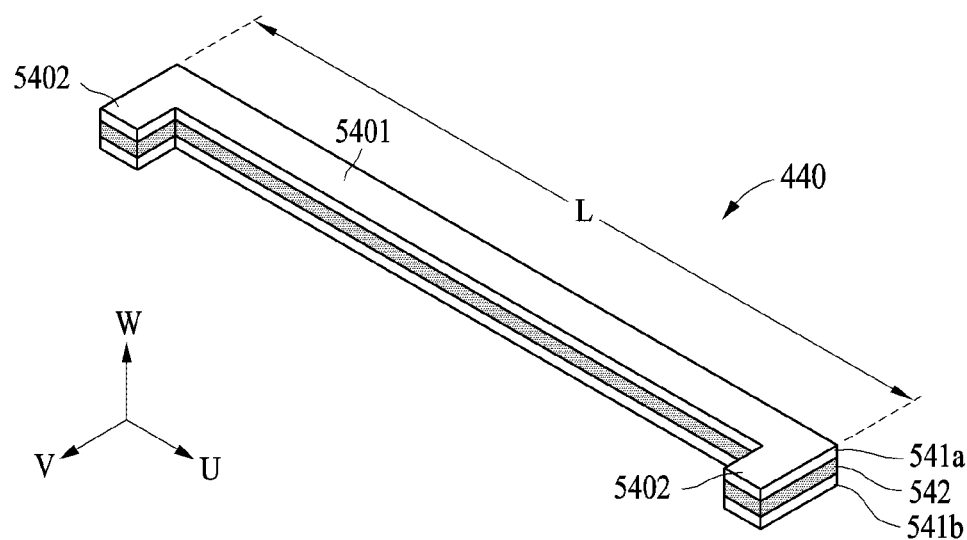
FIGS. 5A, 5B and 5C are perspective views of a detection sensor according to various embodiments.
Figure 5B:
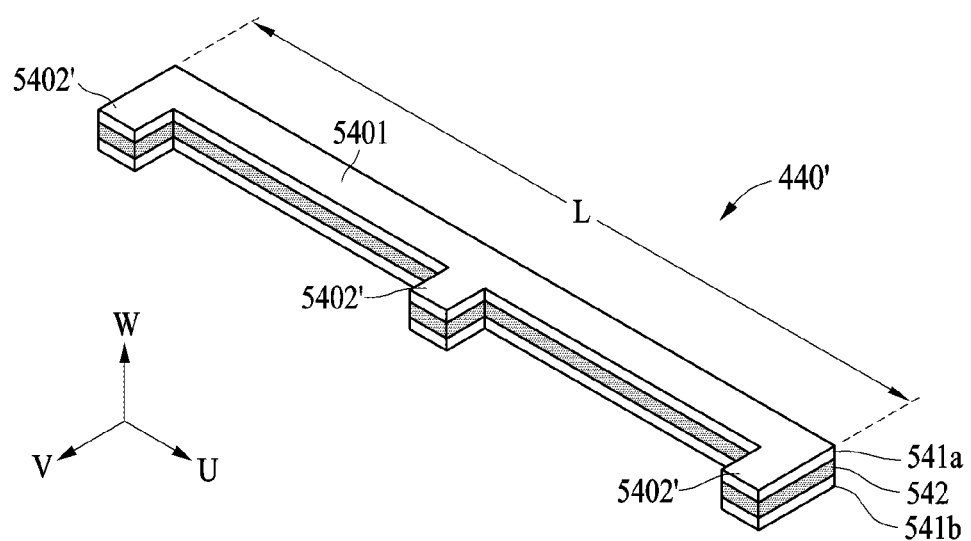
Figure 5C:
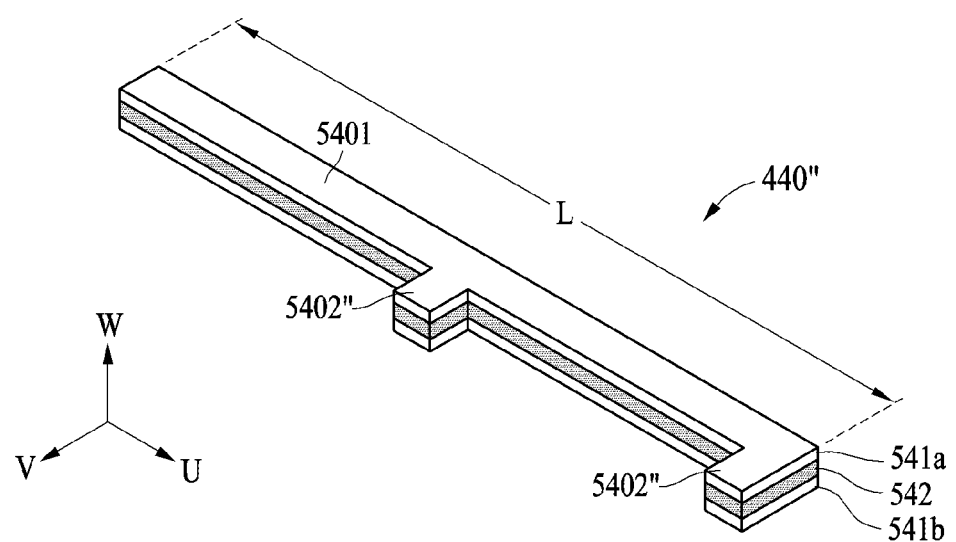
Figure 6A:
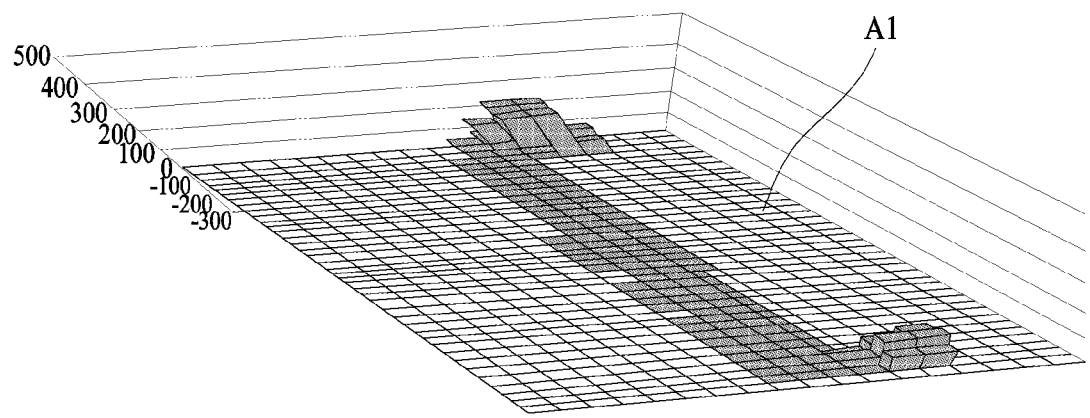
FIGS. 6A and 6B are diagrams illustrating detection data obtained by a detection sensor of display based on an operation of an electronic device according to various embodiments.
Figure 6B:
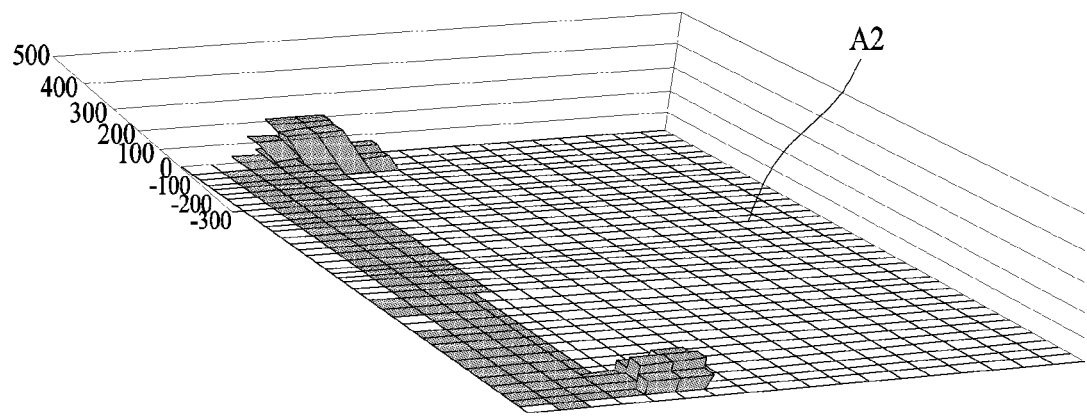

FIG. 4A is a cross-sectional view of an electronic device in a first state according to various embodiments, FIG. 4B is a cross-sectional view of the electronic device in a second state according to various embodiments, FIGS. 5A, 5B and 5C are perspective views of a detection sensor according to various embodiments, and FIGS. 6A and 6B are diagrams illustrating example detection data obtained by a detection sensor of display based on an operation of an electronic device according to various embodiments.

Referring to FIGS. 4A, 4B, and 5A, an electronic device 401 (e.g., the electronic device 101 of FIG. 1 and the electronic device 201 of FIG. 2A) according to various example embodiments may include a housing structure 400, a flexible display 430, a detection sensor 440, and a processor (e.g., the processor 120 of FIG. 1).

In an example embodiment, the housing structure 400 may include a first housing 410 and a second housing 420 forming an exterior of the electronic device 401. The first housing 410 and the second housing 420 may be partially and movably connected. For example, the second housing 420 may be coupled to the first housing 410 to be movable in a moving direction D (e.g., an X-axis direction of FIG. 4A) with respect to the first housing 410. In an example embodiment, the size of an internal space 403 of the electronic device 401, that is, the internal space 403 formed by the first housing 410 and the second housing 420, may vary based on a relative movement of the first housing 410 and the second housing 420. For example, the first housing 410 and the second housing 420 may be relatively moved by an operation of the electronic device 401 such that a state may change between a first state (e.g., the closed state of FIG. 2A) in which the size of the internal space 403 is minimized and/or reduced, as shown in FIG. 4A, and a second state (e.g., the open state of FIG. 2B) in which the size of the internal space 403 is maximized and/or enlarged, as shown in FIG. 4B.

In an example embodiment, the housing structure 400 may include an outlet 402 formed on a front surface direction (e.g., the Y-axis direction of FIG. 4A) of the housing structure 400. In an example embodiment, the outlet 402 may cause the internal space 403 of the housing structure to communicate with the outside by being formed between the first housing 410 and the second housing 420. In an example embodiment, the outlet 402 may be formed to have a formation direction (e.g., the Y-axis direction of FIG. 4A) perpendicular to the moving direction D while facing a front surface (e.g., a surface facing a +Z-axis of FIG. 4A) of the housing structure 400. In an example embodiment, during a moving process of the second housing 420 with respect to the first housing 410, a portion of the flexible display 430 may move through the outlet 402. In this case, a length in the formation direction of the outlet 402 may be formed to be greater than a length in a formation direction of the flexible display 430.

In an example embodiment, the flexible display 430 may be supported by the first housing 410 and the second housing 420, and may be visually exposed (e.g., visible) to the outside, for example, a front surface (e.g., a top surface of FIG. 4A) of the housing structure 400, of the electronic device 401 through a display area. In an example embodiment, a size of a display area A, which is exposed (e.g., visible) to the outside, of the flexible display 430 may change based on the relative movement of the first housing 410 and the second housing 420. For example, the size of the display area A of the flexible display 430 may vary between a first state with a minimum size A1, as shown in FIG. 4A, and a second state with a maximum size A2, as shown in FIG. 4B.

Hereinafter, for ease of description, an operation of relative movement of the first housing 410 and the second housing 420 is described based on an assumption that the second housing 420 moves in the moving direction D with respect to the first housing 410.

In an example embodiment, at least a portion of the flexible display 430 may be mounted to a surface of the housing structure 400, and at least another portion of the flexible display 430 may be accommodated in the inside the housing structure 400. For example, a portion of the flexible display 430 may be mounted to a surface of the second housing 420, and the other portion of the flexible display 430 may be accommodated in the internal space 403, formed by the first housing 410, of the housing structure 400. In an example embodiment, a portion of the flexible display 430 may be withdrawn to a surface of the housing structure 400 from the internal space 403 through the outlet 402 according to the relative movement of the second housing 420 with respect to the first housing 410, or may be inserted into the internal space 403 from the surface of the housing structure 400 through the outlet 402. In other words, a portion of the flexible display 430 may move between the internal space 403 and the surface of the housing structure 400 through the outlet 402 through an operation of the housing structure 400 such that the size of the display area A exposed (e.g., visible) to the surface of the housing structure 400 may vary.

In an example embodiment, the flexible display 430 may include a touch screen panel (TSP). The TSP may recognize an electrical signal applied to the flexible display 430, for example, a touch input signal or a hovering signal on the flexible display 430. In an example embodiment, the TSP may be selectively activated based on an operation of the electronic device 401. For example, the TSP may be controlled to be activated in case a withdrawal operation of the flexible display 430, that is, an operation that the second housing 420 moves with respect to the first housing 410, is detected.

In an example embodiment, the flexible display 430 may include an unbreakable (UB)-type organic light-emitting diode (OLED) display (e.g., a curved display) including a micro-LED, or an OLED. In an example embodiment, the flexible display 430 may include an on cell touch active matrix organic light-emitting diode (AMOLED) (OCTA)-type display. However, the type of the flexible display 430 is not limited to the example described above, and the flexible display 430 may be formed in various ways (e.g., an add-on type or an in-cell type).

In an example embodiment, the flexible display 430 may include a display panel, a protective film (or a window) stacked on a front surface of the display panel, and a cover panel attached to a rear surface of the display panel. In an example embodiment, the protective film, which is a thin film layer formed of a transparent material, may be formed as a thin film to protect the display panel from the surroundings and to support the flexibility of the display panel. In an example embodiment, the protective film may include a plastic film (e.g., a polyimide film) or thin glass (e.g., ultra-thin glass (UTG)).

In an example embodiment, the cover panel may prevent and/or inhibit the display panel from being twisted or bent. In an example embodiment, the cover panel may include a plurality of layers to implement each function. The plurality of layers included in the cover panel may be stacked via an adhesive member. For example, the cover panel may include an embo layer, a buffer layer, or a metal layer. In an example embodiment, the embo layer may block light incident from the outside. The embo layer may be black-coated to prevent and/or reduce components in the internal space 403 from being visually exposed (e.g., visible) to the outside through the display area of the flexible display 430. In an example embodiment, the buffer layer may absorb an impact applied to the flexible display 430 to prevent and/or reduce damage to the flexible display 430. For example, the buffer layer may include a sponge layer or a cushion layer. In an example embodiment, the metal layer may prevent and/or reduce the flexible display 430 from being twisted or bent, and may perform a function of dispersing heat generated from components placed in the internal space 403 of the electronic device 401 or the flexible display 430 itself over the entire area of the flexible display 430 to dissipate the heat. In an example embodiment, the metal layer may include a composite sheet and a copper sheet. The composite sheet may be, for example, a sheet obtained by processing several sheets with different properties, and may include at least one of polyimide and graphite. The composite sheet may also be formed as a single sheet formed of one material (e.g., polyimide or graphite).

The detection sensor 440 may be used for detecting a change in the size of the display area. In an example embodiment, the detection sensor 440 may be disposed on an inner surface of the housing structure 400, adjacent to the outlet 402, for example, an inner side surface of the first housing 410, adjacent to the outlet 402. In an example embodiment, the detection sensor 440 may be disposed to face a surface of the flexible display 430 placed on the outlet 402. In this case, the detection sensor 440 may be maintained in a state in which the detection sensor 440 is facing a portion of the flexible display 430 regardless of an operation of the electronic device 401. For example, regardless of a process of changing the size of the display area between the first state in FIG. 4A and the second state in FIG. 4B, since a portion of the flexible display 430 is placed on the outlet 402, the detection sensor 440 may face an area, placed on the outlet 402, of the flexible display 430.

In an example embodiment, the detection sensor 440 may have its own capacitance. For example, the detection sensor 440 may include a first electrode 541a and a second electrode 541b, which include a conductive material and are disposed side by side at an interval, and a dielectric 542 disposed between the first electrode 541a and the second electrode 541b. In this case, the detection sensor 440 may function as a capacitor having a predetermined (e.g., specified) capacitance. In an example embodiment, in case first electrode 541a and the second electrode 541b have the same size, a capacitance value of the detection sensor 440 may be determined by Equation 1 shown below.

$$C_S = \varepsilon_s * (S/d) \qquad \text{Equation 1}$$

$C_S$=A capacitance value of the detection sensor.

$\varepsilon_s$=permittivity of the dielectric, S=size of electrode, d=interval between the electrodes In an example embodiment, the dielectric 542 may be formed of a water absorbent material, such as sponge or paper. In an example embodiment, the detection sensor 440 may be disposed on the housing structure 400 such that the first electrode 541b faces a surface, which passes through the outlet 402, of the flexible display 430. For example, the second electrode 541b of the detection sensor 440 may be connected to an inner surface of the first housing 410, and the first electrode 541a may be disposed to face the flexible display 430. According to the structure described above, the detection sensor 440 may apply a hovering input signal or a touch input by capacitance to an area of the flexible display 430 adjacent to the detection sensor 440, that is, a display area, which passes through the outlet 402. Accordingly, a signal applied by the detection sensor 440 may be recognized through the flexible display 430 or the TSP.

In an example embodiment, the detection sensor 440 may be formed in a shape having a predetermined signal pattern. Since a signal pattern, which is recognized through the flexible display 430, of the detection sensor 440 is determined by the shape of the detection sensor 440, by being formed to have a predetermined shape, the detection sensor 440 may form a signal pattern discriminated from another signal (e.g., an erroneous touch by the user of the flexible display 430). In an example embodiment, the detection sensor 440 may include a first portion 5401 having a length direction L, one or more second portions 5402 protruding in one direction from the first portion 5401. In an example embodiment, the detection sensor 440 may be disposed such that the length direction L of the first portion 5401 is parallel with the formation direction of the outlet 402. In other words, in a state facing a front surface of the housing structure 400, the detection sensor 440 may be disposed such that the length direction L of the first portion 5401 is perpendicular to the moving direction D of the second housing 420 with respect to the first housing 410. In an example embodiment, the detection sensor 440 may be disposed such that the first portion 5401 is facing the front surface of the housing structure 400. For example, the detection sensor 440 may be disposed such that the first portion 5401 is relatively facing toward the outside of a housing, compared to the second portion 5402.

In an example embodiment, in case a plurality of second portions 5402 is formed in the detection sensor 440, the plurality of second portions 5402 may protrude in a predetermined direction with respect to the first portion 5401. For example, the detection sensor 440 may be formed in a shape including two second portions 5402 formed at both end portions of the length direction L of the first portion 5401. However, the shape of the detection sensor 440 is not limited to the example shown in FIG. 5A. For example, detection sensors 440' and 440" may be respectively formed to include a plurality of second portions 5402' and 5402" protruding from one or more portions of the first portion 5401, as shown in FIGS. 5B and 5C, and in case the detection sensor 440 includes the plurality of second portions 5402, a shape or a length of each of the second portions 5402 may be same or different to the other.

According to the structure described above, the processor may determine whether an electrical signal applied to the flexible display 430 is an electrical signal of the detection sensor 440 through a signal pattern applied to the flexible display 430. For example, in case the detection sensor 440 has the shape shown in FIG. 5A, a pattern of an electrical signal applied to the flexible display 430 by the detection sensor 440 may have a similar form shown in FIG. 6A. In an example embodiment, the processor may more accurately determine whether an electrical signal applied to the flexible display 430 is caused by the detection sensor 440 or by an erroneous recognition such as an erroneous touch by the user, by comparing a pattern of the electrical signal applied to the flexible display 430 to a set signal pattern of the detection sensor 440.

In an example embodiment, the processor may detect the size of the display area of the flexible display 430 in real time through a signal of the detection sensor 440 applied to the flexible display 430. In an example embodiment, in a state in which the size of the display area of the flexible display 430 is changing, that is, a state in which the second housing 420 is moving with respect to the first housing 410, a relative position of the detection sensor 440 may change with respect to the flexible display 430. For example, in a first state shown in FIG. 4A, a signal of the detection sensor 440, detected on the flexible display 430, may be as shown in FIG. 6A, and in a second state shown in FIG. 4B, a signal of the detection sensor 440, detected on the flexible display 430, may be as shown in FIG. 6B.

Accordingly, the processor may detect a relative position of the detection sensor 440 with respect to the flexible display 430 through a touch screen function or another detection structure of the flexible display 430. In an example embodiment, since a signal of the detection sensor 440 is applied to a region, which is placed on the outlet 402, of the flexible display 430, the processor may detect, in real time, a degree of expansion of the flexible display 430, in other words, a change in a size of the display area of the flexible display 430, by detecting signal coordinates of the detection sensor 440, applied to the flexible display 430 in real time. For example, in case an operational state of the electronic device 401 has changed from the first state shown in FIG. 4A to the second state shown in FIG. 4B, a signal pattern of the detection sensor 440, applied to the flexible display 430, may change from FIG. 6A to FIG. 6B. In this case, the processor may calculate that the size of the display area A of the flexible display 430 changes from A1 to A2, through coordinates of the signal pattern applied to the flexible display 430.

In an example embodiment, the processor may determine an operational state of the electronic device 401 through a signal of the detection sensor 440, applied to the flexible display 430. For example, in case a signal of the detection sensor 440 applied to the flexible display 430 shows a first shape (e.g., the signal of the detection sensor 440 shown in FIG. 6A), the processor may determine that the electronic device 401 is in a first state (e.g., the closed state shown in FIG. 2A), and in case the signal of the detection sensor 440, applied to the flexible display 430, shows a second shape (e.g., the signal of the detection sensor 440 shown in FIG. 6B), the processor may determine that the electronic device 401 is in a second state (e.g., the open state shown in FIG. 2B).

Figure 7:
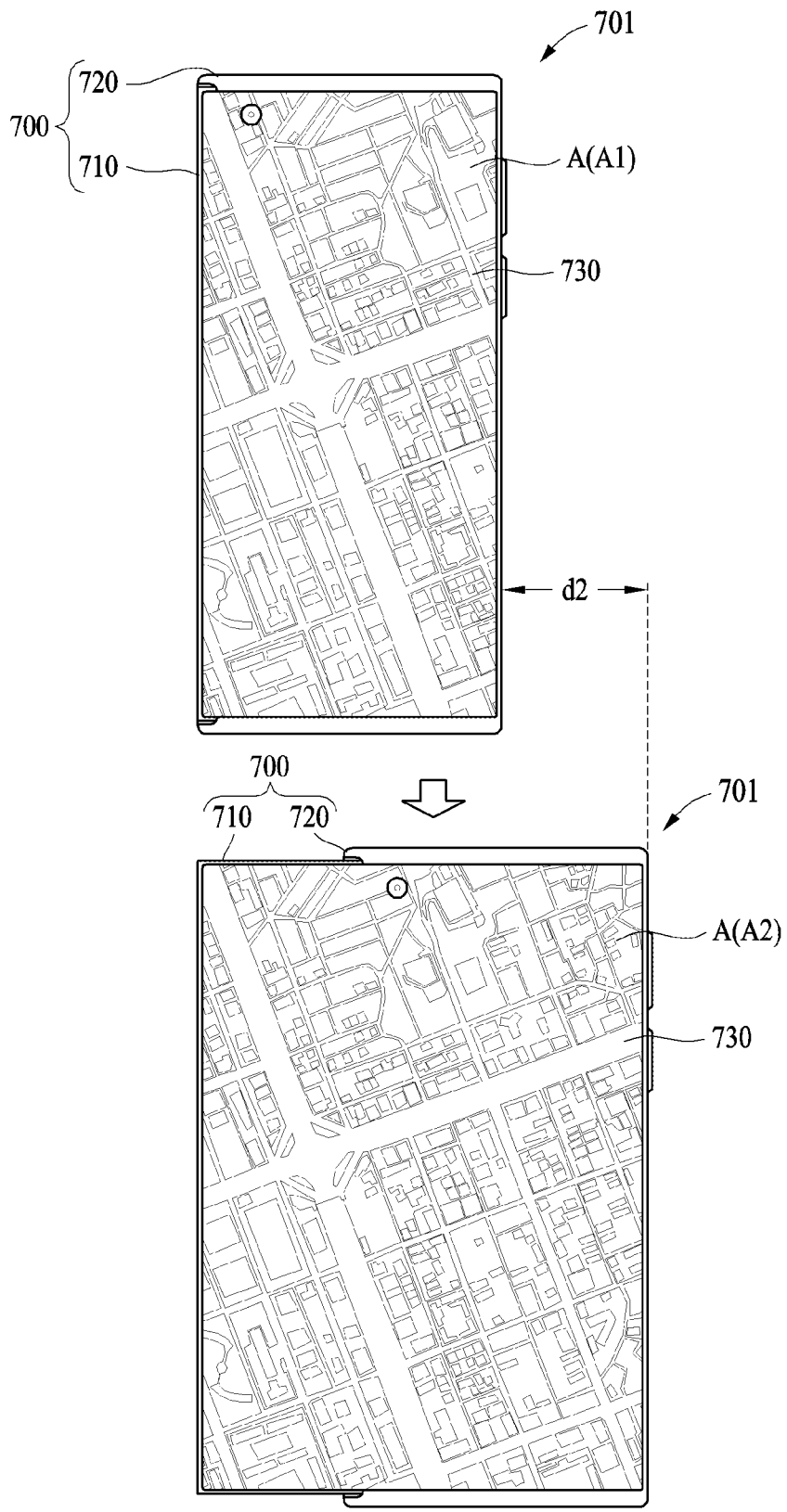
FIG. 7 is a diagram illustrating an example operation of a display based on an operational state of an electronic device according to various embodiments.

FIG. 7 is a diagram illustrating an example operation of a display based on an operational state of an electronic device according to various embodiments.

Referring to FIG. 7, an electronic device 701 may adjust a size of a visual image displayed on a flexible display 730 corresponding to a size of a display area A of the flexible display 730. In an example embodiment, the electronic device 701 may include a housing structure 700 including a first housing 710 and a second housing 720, the flexible display 730, and a processor (e.g., the processor 120 of FIG. 1).

In an example embodiment, a shape of the housing structure 700 may vary based on a relative movement of the first housing 710 and the second housing 720. In an example embodiment, a size of a display area, exposed (e.g., visible) to the outside, of the flexible display 730 may change based on the relative movement of the second housing 720 with respect to the first housing 710. For example, in case the second housing 720 moves in a moving direction with respect to the first housing 710 by a length d2, as shown in FIG. 7, the display area A of the flexible display 730 may change from a first area A1 to a second area A2. In an example embodiment, the flexible display 730 may display a visual image to a user through the display area A.

In an example embodiment, the processor may detect a change in a size of the display area A in real time. For example, the processor may detect the size of the display area through coordinates of a signal applied to the flexible display 730 by a detection sensor (e.g., the detection sensor of FIG. 4A). In an example embodiment, the processor may adjust a size of a visual image displayed on the flexible display 730 corresponding to the size of a detected display area A. For example, in case the display area of the flexible display 730 expands from the first area A1 to the second area A2, the processor may expand a size of a visual image corresponding to a change in the size of the display area A and may display the visual image on the flexible display 730. In an example embodiment, in case the size of the display area has changed, the processor may store an offset value based on a change in the size of the display area A from a default value, and may rearrange a position of a visual image displayed on the display area A through the stored offset value.

Figure 8A:
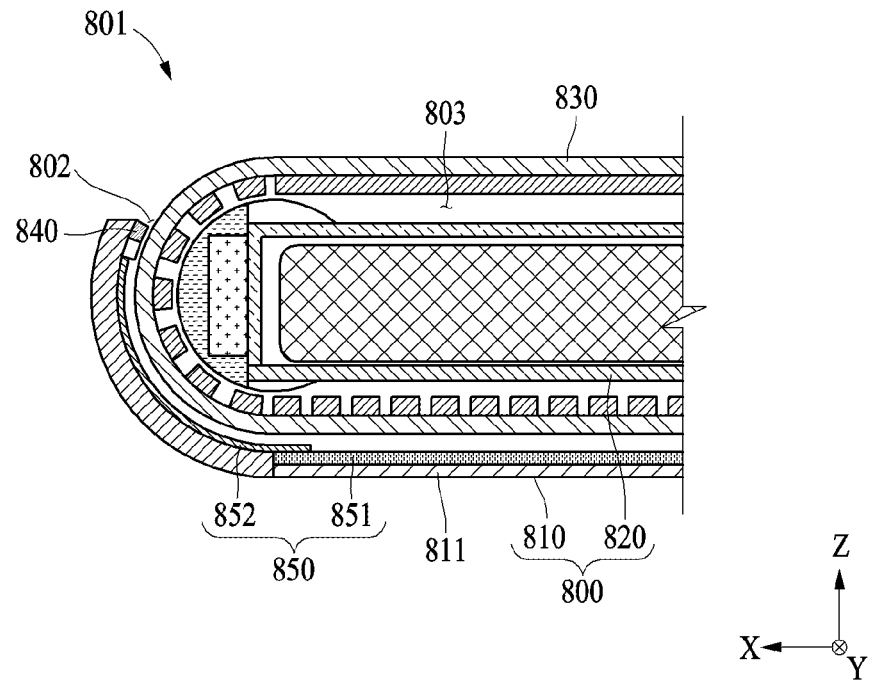
FIGS. 8A and 8B are cross-sectional views of an electronic device according to various embodiments.
Figure 8B:
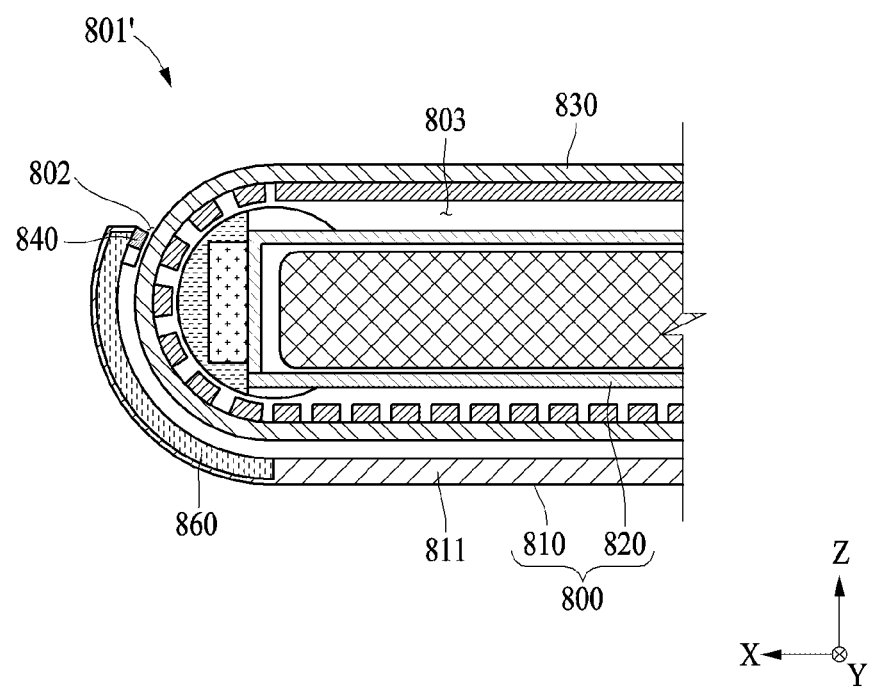

FIGS. 8A and 8B are cross-sectional views of an electronic device according to various embodiments.

Referring to FIG. 8A, an electronic device 801 may include a housing structure 800, a flexible display 830, a detection sensor 840, and a grounding structure 850.

In an example embodiment, the housing structure 800 may include a first housing 810 and a second housing 820 that is movably coupled to the first housing 810. In an example embodiment, an outlet 802 communicating with an internal space 803 may be formed on a front surface of the housing structure 800. For example, the outlet 802 may be formed between the first housing 810 and the second housing 820.

In an example embodiment, the housing structure 800 may include a main ground region for maintaining a voltage applied to the electronic device 801 within a predetermined range. For example, the main ground region may be formed on a rear surface of the housing structure 800, opposite to the front surface, on which the flexible display 830 is exposed (e.g., visible), of the housing structure 800. For example, the main ground region may be formed inside a back glass 811, in which the first housing 810 is disposed.

The flexible display 830 may be supported by the housing structure 800 and may include a display area exposed (e.g., visible) to the outside through the front surface of the housing structure 800. In an example embodiment, at least a portion of the flexible display 830 may be mounted to the front surface of the housing structure 800, and the other portion thereof may be disposed in the internal space 803 of the housing structure 800. In an example embodiment, a portion of the flexible display 830 may be withdrawn to the front surface of the housing structure 800 from the internal space 803 through the outlet 802 or may be inserted into the internal space 803 from the front surface of the housing structure 800 through the outlet 802 based on a moving operation by the second housing 820 with respect to the first housing 810. According to the structure described above, based on an operation of relative movement of the second housing 820 with respect to the first housing 810, a size of the display area, exposed (e.g., visible) at the front surface of the housing structure 800, of the flexible display 830 may vary.

In an example embodiment, the detection sensor 840 may be disposed on the housing structure 800 to be adjacent to the outlet 802. For example, the detection sensor 840 may be attached to an inner surface of the first housing 810, in which the outlet 802 is formed. The detection sensor 840 may apply an electrical signal based on its own capacitance to a region, which passes through the outlet, of the flexible display 830.

In an example embodiment, the grounding structure 850 may include a grounded portion 851 and a current carrying portion 852. In an example embodiment, the grounded portion 851 and the current carrying portion 852 may electrically connect the detection sensor 840 to the main ground region. In an example embodiment, the grounded portion 851 may be disposed on the internal space 803 of the housing structure 800, and may be connected to the back glass 811 to current carrying with the back glass 811, which is disposed on an outer surface of the first housing 810. Accordingly, the grounded portion 851 may be electrically connected to the main ground region, which is disposed inside the back glass 811 of the electronic device 801. In an example embodiment, the current carrying portion 852 may be disposed inside the housing structure 800 to electrically connect the detection sensor 840 to the grounded portion 851. For example, the current carrying portion 852 may extend from the outlet 802 to the grounded portion 851 along an inner surface of the first housing 810, and may be disposed on the inner surface of the first housing 810 such that both ends contact with the detection sensor 840 and the grounded portion 851. In an example embodiment, the current carrying portion 852 may be formed as conductive tape formed of a conductive material, or a layer coated inside the housing with a conductive material. According to the structure described above, the detection sensor 840 may be connected to the back glass 811 through the grounded portion 851 and the current carrying portion 852, and thus, may be electrically connected to the main ground region. In other words, a grounding path connecting the detection sensor 840 to the main ground region may be formed through the grounded portion 851 and the current carrying portion 852.

In an example embodiment, since the outlet 802 causes the internal space 803 of the housing structure 800 to communicate with the outside, a surge voltage from the outside may enter the internal space 803 of the housing structure 800 through the outlet 802. In this case, a current based on the surge voltage entering the internal space 803 of the housing structure 800 through the outlet 802 may be applied to the detection sensor 840 and may move to the main ground region through the grounded portion 851 and the current carrying portion 852, and thus, an electronic component disposed in the internal space 803 of the housing structure 800 may be prevented and/or reduced from being damaged by the surge voltage.

Referring to FIG. 8B, an electronic device 801', according to an example embodiment, may include the housing structure 800 including a first housing and a second housing, the flexible display 830, the detection sensor 840, and a current carrying portion 860.

In an example embodiment, the current carrying portion 860 may be installed to the housing structure 800 to electrically connect the detection sensor 840 to a main ground region of the housing structure 800. For example, the current carrying portion 860 may include a conductive member simultaneously contacting both the detection sensor 840 and the back glass 811. In this case, the back glass 811 may be connected to a ground region of the electronic device 801'. In an example embodiment, the housing structure 800 may include a slot provided in an inner surface of the first housing such that the housing structure 800 may extend from the outlet 802 to the back glass 811, and the current carrying portion 860 may be seated on the slot. In this case, the detection sensor 840 may be disposed on the inner surface of the housing structure 800 to contact with the current carrying portion 860. Accordingly, the current carrying portion 860 may form a grounding path connecting the detection sensor 840 to the back glass 811.

Figure 9:
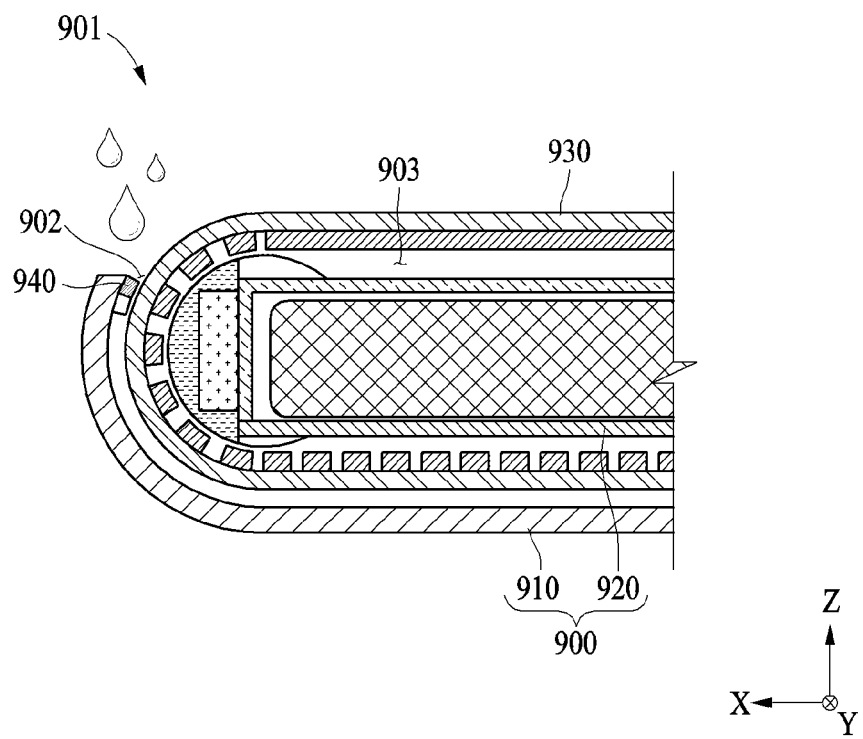
FIG. 9 is a cross-sectional view of an electronic device according to various embodiments.
Figure 10:
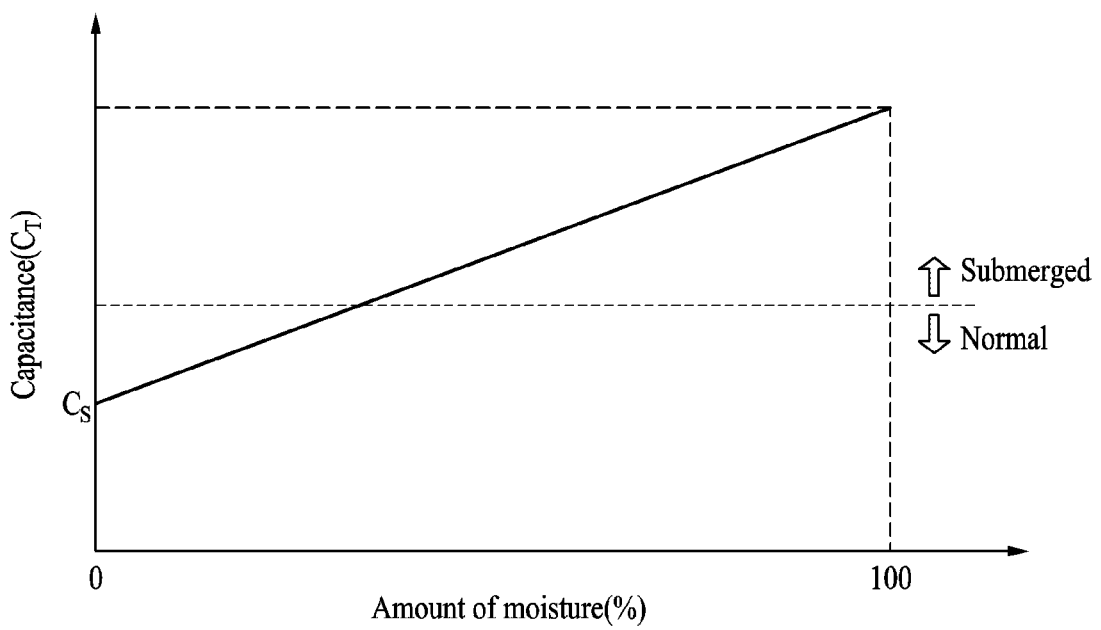
FIG. 10 is a graph illustrating a change of a signal value of a detection sensor according to various embodiments.

FIG. 9 is a cross-sectional view of an electronic device according to various embodiments, and FIG. 10 is a graph illustrating a change of a signal value of a detection sensor according to various embodiments.

Referring to FIGS. 9 and 10, in an example embodiment, an electronic device 901 may include a housing structure 900, a flexible display 930, a detection sensor 940, and a processor (e.g., the processor 120 of FIG. 1).

In an example embodiment, the housing structure 900 may include a first housing 910 and a second housing 920 that is partially and movably coupled to the first housing 910. In an example embodiment, an outlet 902 that causes an internal space to communicate with the outside may be formed on a front surface of the housing structure 900. For example, the outlet 902 may be formed between the first housing 910 and the second housing 920. In an example embodiment, the flexible display 930 may be supported by the housing structure 900, and may be exposed (e.g., visible) to the outside through a display area, which is exposed (e.g., visible) on the front surface of the housing structure 900. In an example embodiment, a size of the display area may change as a portion of the flexible display 930 moves between the internal space of the housing structure 900 and the outside based on movement of the second housing 920 with respect to the first housing 910. In other words, the portion of the flexible display 930 may be withdrawn from the internal space of the housing structure 900 to the outside through the outlet 902, or may be inserted into the internal space of the housing structure 900 from the outside.

The detection sensor 940 may be disposed on the portion of housing structure 900, adjacent to the outlet 902. For example, the detection sensor 940 may be disposed on an inner surface of the first housing 910, in which the outlet 902 is formed. In an example embodiment, the detection sensor 940 may have its own capacitance, and may apply an electrical signal, based on the self-capacitance, to a region, placed on the outlet 902, of the flexible display 930. In an example embodiment, the detection sensor 940 may absorb moisture, and capacitance of the detection sensor 940 may vary based on an amount of absorbed moisture. For example, the detection sensor 940 may include a dielectric (e.g., the dielectric 542 of FIG. 5A), and the dielectric may be formed of a material, which may absorb moisture. In this case, when moisture flows into the detection sensor 940, as shown in FIG. 10, a capacitance value of the detection sensor 940 may increase based on an amount of moisture inflow.

In an example embodiment, the processor may determine a degree of moisture inflow into the internal space of the housing structure 900 through a capacitance value generated by the detection sensor 940. In an example embodiment, when moisture flows into the internal space of the housing structure 900 from the outside through the outlet 902, the detection sensor 940 disposed on the outlet 902 may absorb the moisture that flowed through an inlet, and thus, capacitance of detection sensor 940 may change. In this case, the electronic device 901 may detect a capacitance value of the detection sensor 940 through the flexible display 930. In an example embodiment, the electronic device 901 may be electrically connected to the detection sensor 940, and may include a detector (not shown) configured to detect a change in capacitance generated by the detection sensor.

In an example embodiment, the processor may determine a degree of submersion of the electronic device 901 by comparing a set reference value to the capacitance of the detection sensor 940 detected through the flexible display 930 or the detector. For example, in case the capacitance generated by the detection sensor 940 changes based on a degree of moisture inflow of the detection sensor 940, as shown in FIG. 10, when a detected capacitance of the detection sensor 940 exceeds the set reference value, the processor may determine that the electronic device 901 is submerged, and when the detected capacitance of the detection sensor 940 is less than the set reference value, the processor may determine that the electronic device 901 is not submerged. According to this process, the processor may detect whether the electronic device 901 is submerged at an early stage.

In an example embodiment, the processor may perform a corresponding operation based on submersion of the electronic device 901. In an example embodiment, the processor may determine a degree of moisture inflow into the internal space of the housing structure 900 through a capacitance value of the detection sensor 940, and may perform a corresponding operation, which is set based on a degree of submersion of the electronic device 901. In an example embodiment, the processor may perform an operation of displaying a notification based on the degree of submersion of the electronic device 901 to a user. For example, a notification operation for the user may be performed by a method such as vibration of the electronic device 901, generating a warning sound, and displaying a visual image on the flexible display 930. In an example embodiment, in case the electronic device 901 is determined to be submerged, the processor may perform an operation of shutting off the power of the electronic device 901 or an operation of blocking the power from being applied to a main component, such as a memory, disposed in the internal space of the housing structure 900. In this case, the processor may display a notification according to the power shut-off to the user. According to the method, the electronic device 901 may detect submersion of the electronic device 901 at an early stage, and may minimize and/or reduce damage to an internal component of the electronic device 901 due to moisture inflow.

Figure 11A:
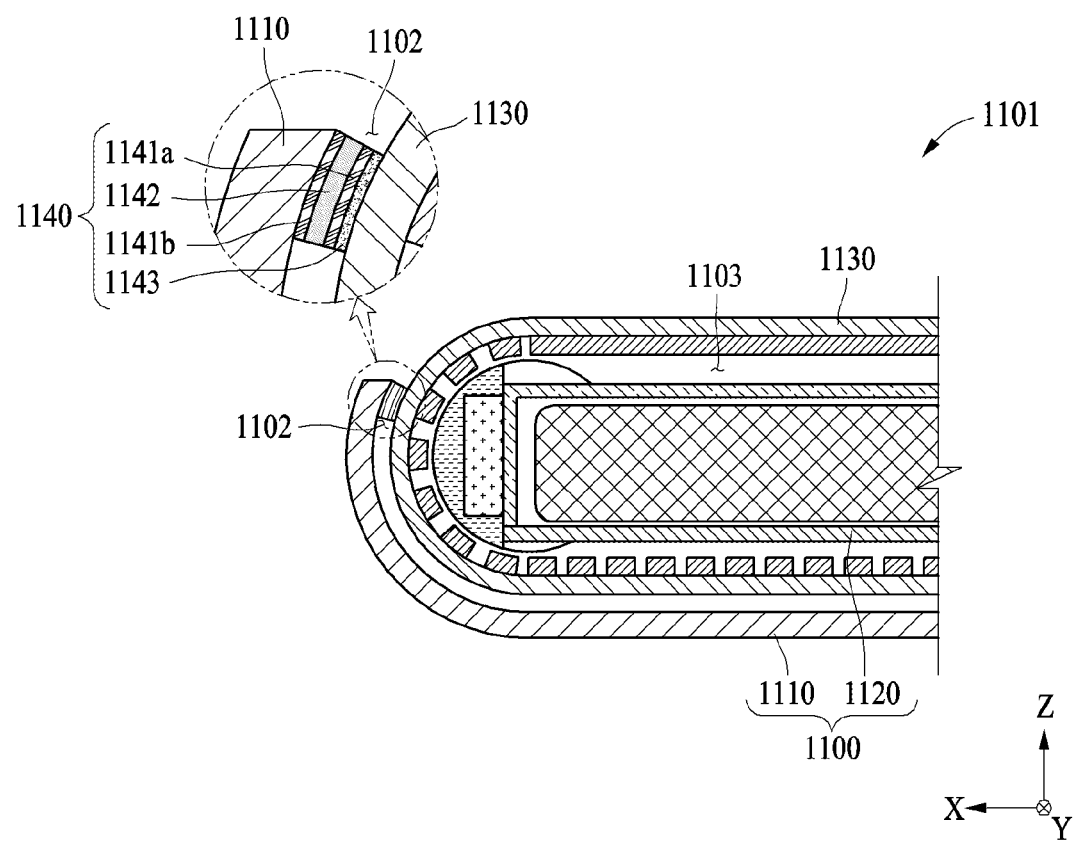
FIG. 11A is a cross-sectional view of an electronic device according to various embodiments.
Figure 11B:
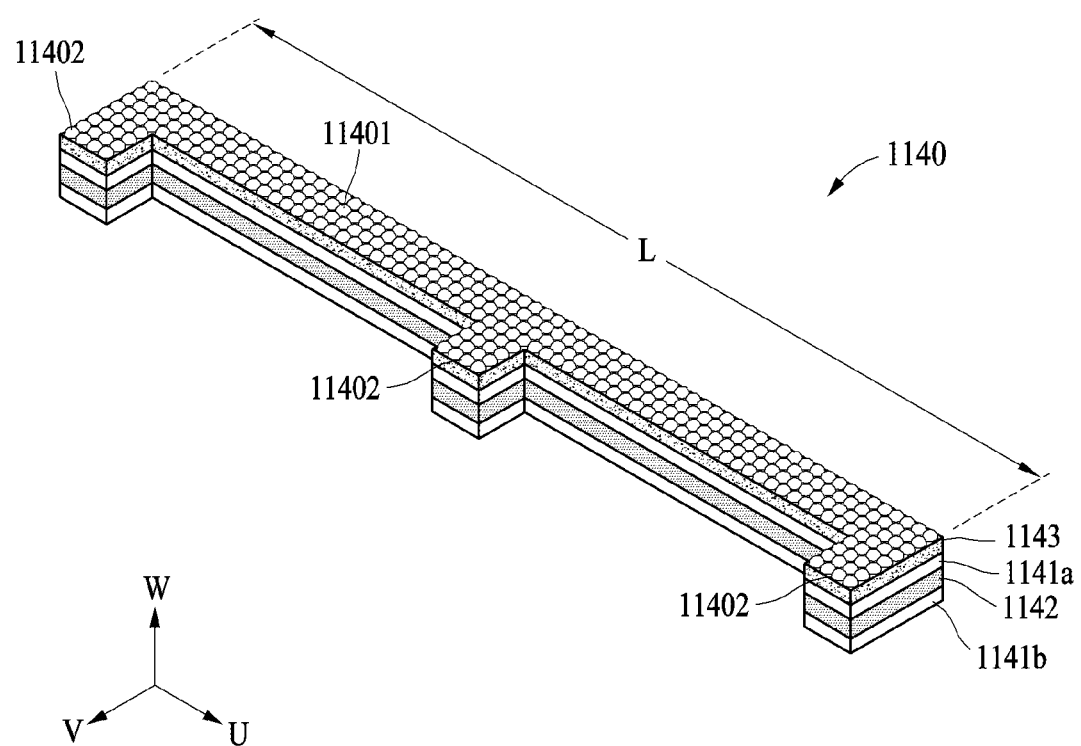
FIG. 11B is a perspective view of a detection sensor according to various embodiments.

FIG. 11A is a cross-sectional view of an electronic device according to various embodiments, and FIG. 11B is a perspective view of a detection sensor according to various embodiments.

Referring to FIGS. 11A and 11B, an electronic device 1101, according to an example embodiment, may include a housing structure 1100, a flexible display 1130, a detection sensor 1140, and a sweeper 1143.

In an example embodiment, the housing structure 1100 may include a first housing 1110 and a second housing 1120 that is partially and movably coupled to the first housing 1110. In an example embodiment, an internal space 1103 and an outlet 1102 communicating with the outside may be provided in the housing structure 1100. For example, the outlet 1102 may be formed between the first housing 1110 and the second housing 1120. In an example embodiment, the flexible display 1130 may be supported by the housing structure 1100, and may be exposed (e.g., visible) to the outside through a front surface of the housing structure 1100. In an example embodiment, according to an operation of relative movement of the first housing 1110 and the second housing 1120, a portion of the flexible display 1130 may be withdrawn from the internal space 1103 of the housing structure 1100 to the outside through the outlet 1102 or may be inserted into the internal space 1103 from the outside, and thus, a size of a region of the housing structure 1100 exposed (e.g., visible) to the outside may change.

In an example embodiment, the detection sensor 1140 may be disposed on the outlet 1102. For example, the detection sensor 1140 may be disposed on an inner surface of the first housing 1110, in which the outlet 1102 is formed. In an example embodiment, the detection sensor 1140 may have self-capacitance, and may apply an electrical signal to a region, which passes through the outlet 1102, of the flexible display 1130. In an example embodiment, the detection sensor 1140 may include a first electrode 1141a and a second electrode 1141b, which are disposed side by side at an interval and include a conductive material, and may include a dielectric 1142 disposed between the first electrode 1141a and the second electrode 1141b, and the sweeper 1143. In an example embodiment, the detection sensor 1140 may be disposed such that the first electrode 1141a may face toward a surface of the flexible display 1130 placed on the outlet 1102. For example, the second electrode 1141b of the detection sensor 1140 may be connected to an inner surface of the first housing 1110, and the first electrode 1141*a* may be disposed to face a region, which is placed on the outlet 1102, of the flexible display 1130.

In an example embodiment, the sweeper 1143 may be attached to an outer surface of the detection sensor 1140, and may contact with a surface of a region, which passes through the outlet 1102, of the flexible display 1130. For example, the sweeper 1143 may be attached to an outer surface of the first electrode 1141*a* of the detection sensor 1140. In an example embodiment, the sweeper 1143 may be formed of a compressible soft material, for example, a low-density elastic body, such as sponge. In an example embodiment, embossing may be formed on a surface part of the sweeper 1143 contacting with a surface of the flexible display 1130. In an example embodiment, the sweeper 1143 may be formed in a shape corresponding to the detection sensor 1140. For example, as shown in FIG. 11B, the sweeper 1143 may be formed in a shape including a first portion 11401 extending in a length direction L, and one or more second portions 11402 protruding from the first portion 11401. In an example embodiment, a length direction L of the detection sensor 1140 may be disposed to be parallel with a formation direction of the outlet 1102. In this case, the first portion 11401 of the sweeper 1143 may simultaneously contact with a region, which is placed on the outlet 1102, of the flexible display 1130 in the length direction L.

According to the structure described above, while the flexible display 1130 is inserted into or is withdrawn through the outlet 1102 based on an operation by the electronic device 1101, the sweeper 1143 may prevent and/or reduce a foreign material from entering the internal space 1103 of the housing structure 1100 from the outside through the outlet 1102. In addition, while a portion of the flexible display 1130 is inserted into the internal space 1103 of the housing structure 1100 through the outlet 1102, the sweeper 1143 may filter dust attached to a surface of a region, which passes through the outlet 1102, of the flexible display 1130.

Figure 12:
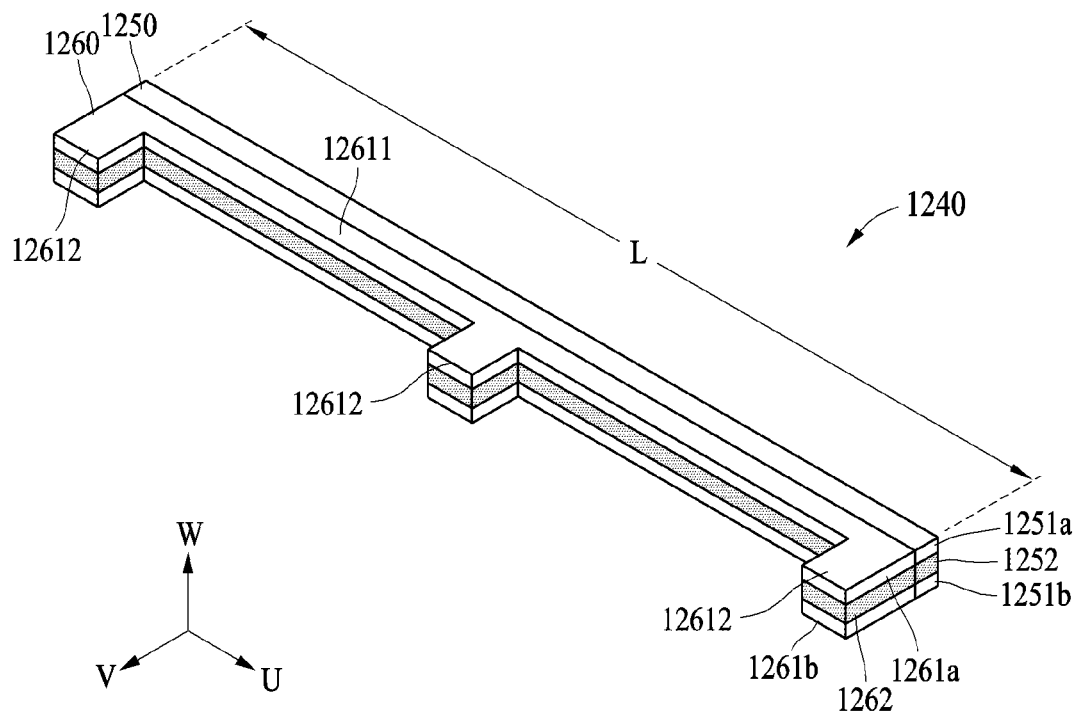
FIG. 12 is a perspective view of a detection sensor according to various embodiments.
Figure 13:
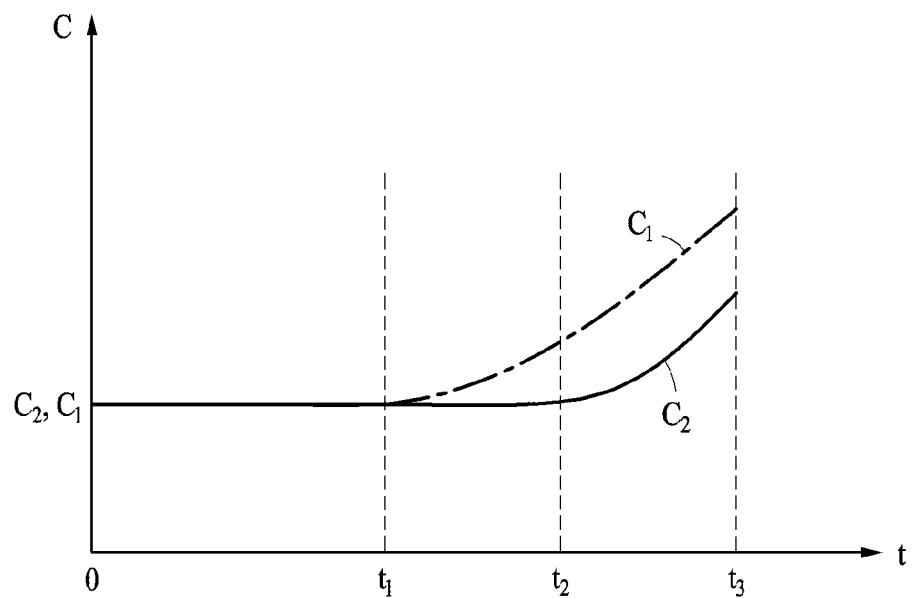
FIG. 13 is a graph illustrating a change of a signal value of a detection sensor according to various embodiments.
Figure 14:
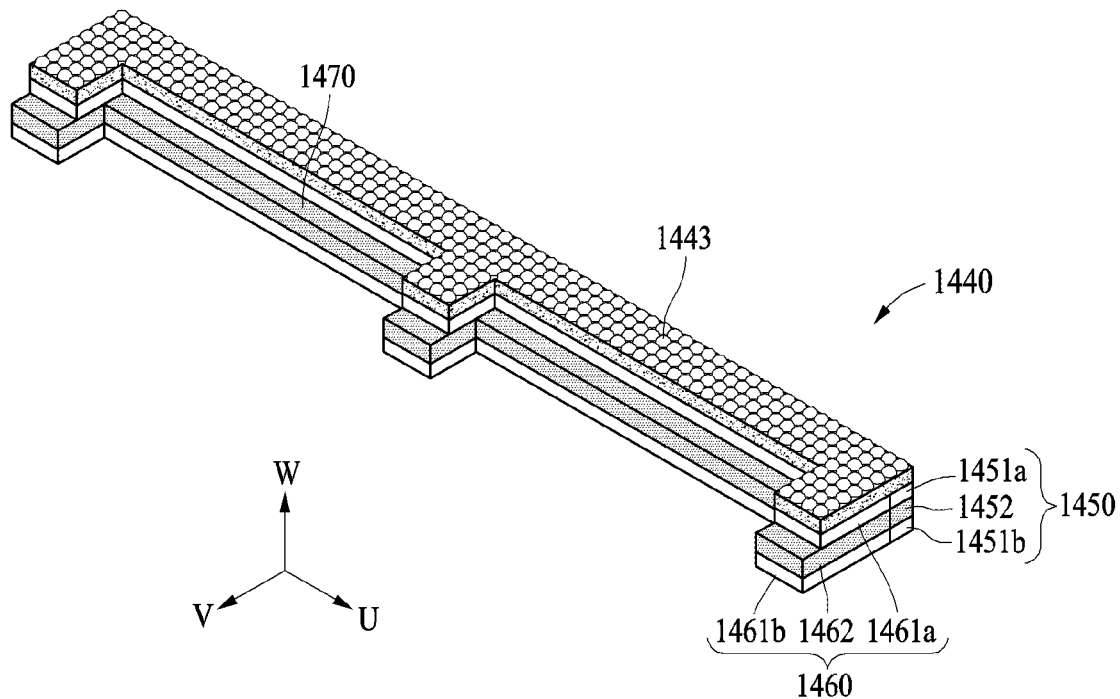
FIG. 14 is a perspective view of a detection sensor according to various embodiments.

FIG. 12 is a perspective view of a detection sensor according to various embodiments, FIG. 13 is a graph illustrating a change of a signal value of a detection sensor according to various embodiments, and FIG. 14 is a perspective view of a detection sensor according to various embodiments.

Referring to FIG. 12, a detection sensor 1240 may include a plurality of detection sensors 1250 and 1260 divided from each other. For example, the detection sensor 1240 may include the first detection sensor 1250 and the second detection sensor 1260. In an example embodiment, in case the detection sensor 1240 include a first portion 12611 extending to a length direction L and a second portion 12612 protruding from the first portion 12611, the first detection sensor 1250 and the second detection sensor 1260 may divide the first portion 12611 into the length direction L. In this case, the second portion 12612 of the detection sensor 1240 may be included in the second detection sensor 1260. In an example embodiment, in a state in which the detection sensor 940 is disposed on the outlet 902 of the housing structure 900, as shown in FIG. 9, the first detection sensor 1250 may be disposed to face the outlet 902, and the second detection sensor 1260 may be disposed to relatively face the internal space 903 compared to the first detection sensor 1250. In other words, the first detection sensor 1250 may be disposed to be adjacent to the outside of a housing structure, compared to the second detection sensor 1260.

In an example embodiment, the first detection sensor 1250 and the second detection sensor 1260 may have self-capacitances, respectively. For example, the first detection sensor 1250 and the second detection sensor 1260 may respectively include first electrodes 1251*a* and 1261*a* connected to each other, second electrodes 1251*b* and 1261*b* connected to each other, and dielectrics 1252 and 1262 disposed between the first electrodes 1251*a* and 1261*a* and the second electrodes 1251*b* and 1261*b* and connected to each other. In an example embodiment, the capacitances of the first detection sensor 1250 and the second detection sensor 1260 may vary depending on the amounts of moisture inflow into the dielectrics 1252 and 1262, respectively. For example, as shown in FIG. 13, capacitance values of the first detection sensor 1250 and the second detection sensor 1260 may linearly increase based on the amounts of moisture inflow into the dielectrics 1252 and 1262.

In an example embodiment, in case the detection sensor 1240 is divided into the first detection sensor 1250 and the second detection sensor 1260, whether an electronic device is submerged may be more accurately determined. For example, in a state in which the detection sensor 1240 is disposed on the outlet 902 of the housing structure 900, as shown in FIG. 9, the first detection sensor 1250 may be disposed to face the outside, and the second detection sensor 1260 may be disposed to face the internal space 903 of the housing structure 900. In this case, the capacitance of the first detection sensor 1250 may vary based on an amount of external moisture in the outlet 902, and the capacitance of the second detection sensor 1260 may vary based on an amount of moisture in the outlet 902. The processor (e.g., the processor 120 of FIG. 1) may more precisely determine whether the electronic device is submerged by comparing and detecting amounts of external moisture and internal moisture of a housing structure through capacitance values of the first detection sensor 1250 and the second detection sensor 1260.

For example, in case the capacitance of the detection sensor 1240 changes as shown in FIG. 13, in a section in which time t is $t_1$ to $t_2$, since the capacitance of the first detection sensor 1250 increases and the capacitance of the second sensor 1260 is constant, the processor may determine that moisture is included in the outside the housing structure, however the processor may determine that there is no moisture inflow into the housing structure. On the other hand, in a section in which time t is $t_2$ to $t_3$, since capacitances of the first detection sensor 1250 and the second detection sensor 1260 simultaneously increase, the processor may determine that moisture is flowing into the inside of the housing structure from the outside of the housing structure. In this case, the processor may perform determining submersion based on a degree of moisture inflow into the inside of the housing structure based on the capacitance of the second detection sensor 1260, and may perform a corresponding operation, which is set based on the determining of the submersion.

Referring to FIG. 14, a detection sensor 1440 may be divided into a first detection sensor 1450 and a second detection sensor 1460. In an example embodiment, the first detection sensor 1450 and the second detection sensor 1460, which are divided parts, may include first electrodes 1451*a* and 1461*a*, second electrodes 1451*b* and 1461*b*, and dielectrics 1452 and 1462, respectively. In an example embodiment, an outer surface of the detection sensor 1440, for example, in case a sweeper 1443 is attached to an outer surface of the first electrodes 1451*a* and 1461*a*, the detection sensor 1440 may include an exposed region 1470, in which a portion of the first electrode 1461*a* is omitted or absent to expose a surface of the dielectric 1462. In this case, the exposed region 1470 may be formed in the second detection sensor 1460. In other words, the second detection sensor 1460 may include the exposed region 1470, in which a portion of the dielectric 1462 is not covered by the first electrode 1461a.

According to the structure described above, since the second detection sensor 1460 is disposed to relatively face an internal space of the housing structure, compared to the first detection sensor 1450, moisture that passed through the outlet may inflow into the second detection sensor 1460 through the sweeper 1443 attached to a surface of the first detection sensor 1450, and may change the capacitance of the detection sensor 1440 by being absorbed by the dielectric 1462 through the exposed region 1470. Accordingly, a change in the capacitance of the detection sensor 1440 may be induced by moisture absorption by the dielectric 1462.

Figure 15:
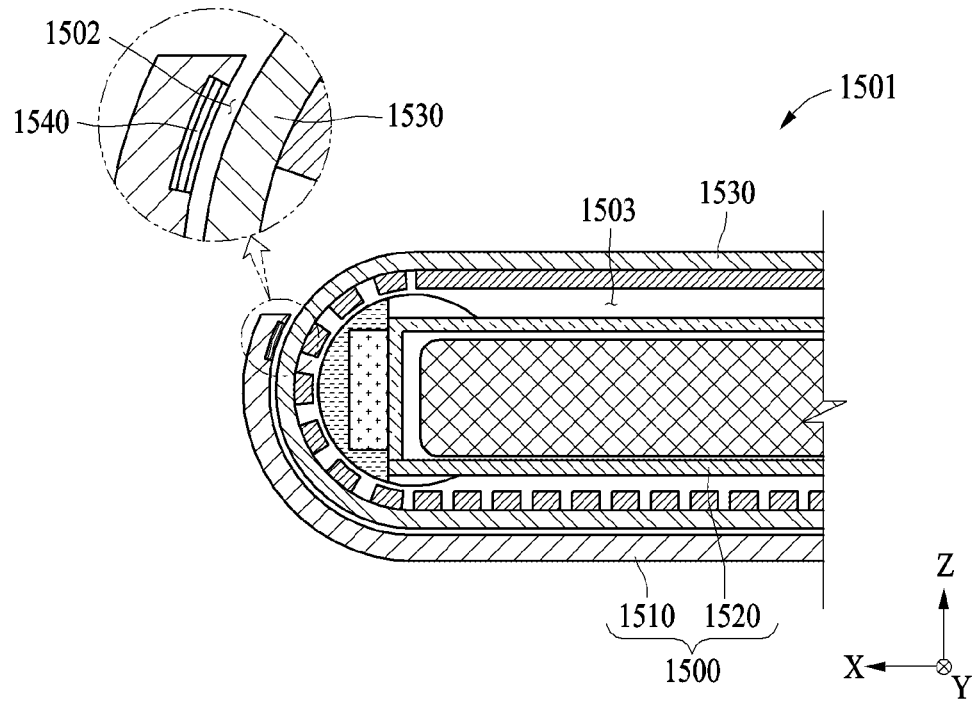
FIG. 15 is a cross-sectional view of an electronic device according to various embodiments.

FIG. 15 is a cross-sectional view of an electronic device according to various embodiments.

Referring to FIG. 15, an electronic device 1501 may include a housing structure 1500, a flexible display 1530, and a detection sensor 1540.

In an example embodiment, the housing structure 1500 may include a first housing 1510 and a second housing 1520 that is partially and movably coupled to the first housing 1510. An outlet 1502 communicating with an internal space 1503 may be formed on a front surface of the housing structure 1500. For example, the outlet 1502 may be formed between the first housing 1510 and the second housing 1520.

In an example embodiment, the flexible display 1530 may be disposed to be supported by the housing structure 1500, and may be exposed (e.g. visible) through the front surface of the housing structure 1500. Depending on movement by the second housing 1520 with respect to the first housing 1510, a portion of the flexible display 1530 may be withdrawn from the internal space 1503 of the housing structure 1500 to the outside through the outlet 1502, or may be inserted into the internal space 1503 of the housing structure 1500 from the outside.

In an example embodiment, the detection sensor 1540 may be disposed the inside of the housing structure 1500, adjacent to the outlet 1502, for example, an inner surface of the first housing 1510. In an example embodiment, the detection sensor 1540 may have self-capacitance, and may apply an electrical signal to a region of the flexible display 1530 which passes through the outlet 1502.

In an example embodiment, the housing structure 1500 may include a slot formed in a region in which the detection sensor 1540 is disposed, in other words, the slot recessed formed in an inner surface part of a housing, adjacent to the outlet 1502. For example, the slot may be formed in an inner surface of the first housing 1510. In an example embodiment, the slot may be formed in a shape, which is substantially the same as the detection sensor 1540. In an example embodiment, sitting in the slot, the detection sensor 1540 may be disposed such that a surface of the detection sensor 1540 facing the flexible display 1530 does not create a step with the inner surface of the first housing 1510.

According to the structure described above, even in case a size of a gap of the outlet 1502 is narrowly formed, the detection sensor 1540 does not narrow a space of the outlet 1502 since the detection sensor 1540 is inserted and installed, and thus, while the flexible display 1530 is passing through the outlet 1502, damage, such as a scratch, or disturbing a moving operation by interference by the detection sensor 1540 may be prevented and/or reduced.

Hereinafter, an embodiment illustrating an example operation of an electronic device is described. In describing the operation of the electronic device, it may be understood that a description which is the same as or similar to the aforementioned description may be omitted.

Figure 16:
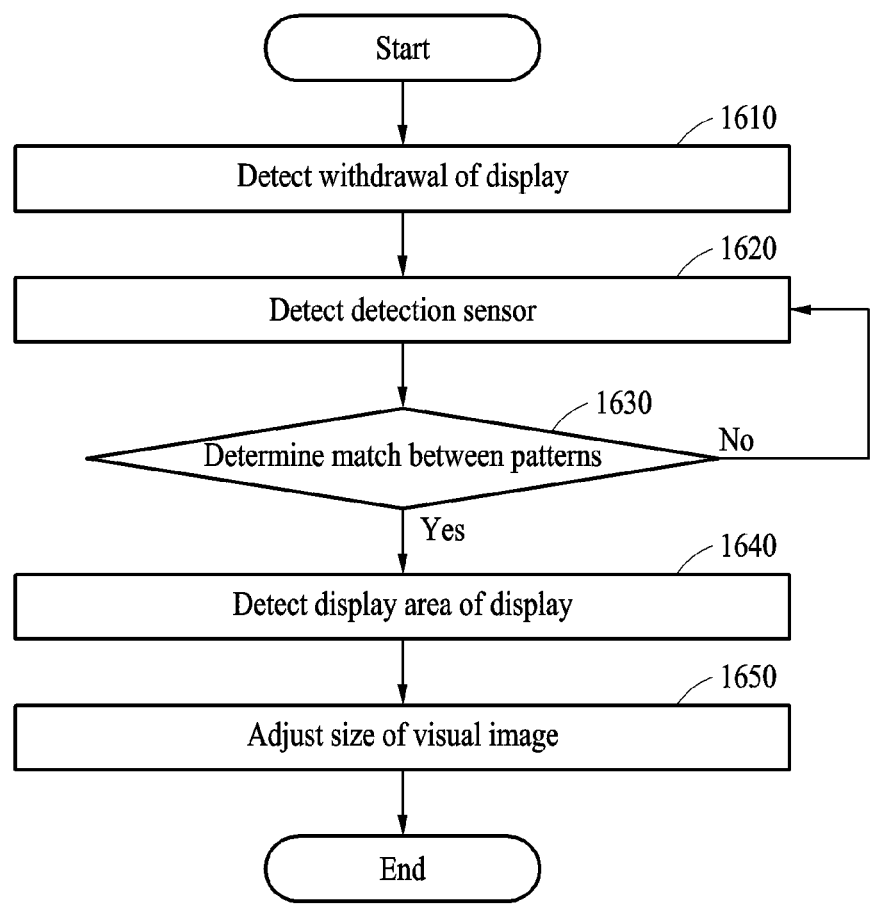
FIG. 16 is a flowchart illustrating an example operation of controlling a display screen of an electronic device, according to various embodiments.

FIG. 16 is a flowchart illustrating an example operation of controlling a display screen of an electronic device, according to various embodiments. FIG. 16 illustrates an example operation of controlling a screen that is displayed on a display (e.g., the flexible display 430 of FIG. 4A) of an electronic device (e.g., the electronic device 401 of FIG. 4A).

In the following example embodiments, operations may be performed sequentially, but not necessarily performed sequentially. For example, the order of the operations illustrated in FIG. 16 may change, and at least two of the operations may be performed in parallel. In addition, each operation illustrated in FIG. 16 is not necessarily performed, and an example may be performed where at least one operation is excluded.

In an example embodiment, operations illustrated in FIG. 16 may be performed by at least one component (e.g., the processor 120 of FIG. 1) of the electronic device.

In operation 1610, a processor may detect an insertion/withdrawal operation of the display 930. For example, the processor may detect an operation of relative movement of the first housing 910 and the second housing 920, based on an expansion or contraction operation of the electronic device 901. For example, through a rotational operation of a roller that supports the display 930, the processor may detect an operation that the display 930 is withdrawn from the internal space of the housing structure 900 to the outside or is inserted to the internal space.

In operation 1620, the processor may detect the detection sensor 940. For example, the processor may detect an electrical signal applied to the display 930 according to the self-capacitance of the detection sensor 940. In operation 1620, the processor may recognize the electrical signal of the detection sensor 940 in case the capacitance of electrical signal falls within a stored recognition range. in the other case, when the capacitance thereof that falls outside the stored recognition range is detected on the display 930, the processor may determine that the electrical signal applied to display 930 is noise by another signal. For example, a signal applied to the display 930 may be a signal by a contact with the detection sensor 940 or a hovering signal.

In operation 1630, the processor may determine whether a signal pattern detected by the display 930 is identical to a signal pattern of the detection sensor 940. For example, the signal pattern of the detection sensor 940 may be stored in a memory. The processor may compare the signal pattern, which is stored in the memory, of the detection sensor 940 with a pattern of the electrical signal applied to the display 930 and may determine whether the two signal patterns are identical to each other.

In operation 1630, in case the pattern of the electrical signal applied to the display 930 does not match the stored signal pattern of the detection sensor 940, the processor may determine that the signal applied to the display 930 is information by misrecognition, and may recognize a signal applied to the display 930 again.

In operation 1640, in case the processor determines that the signal pattern of the detection sensor 940 is recognized, the processor may detect the display area of the display 930 through the recognized signal of the detection sensor 940. For example, the processor may calculate a size of the display area of the display 930 exposed (e.g., visible) to the outside of the electronic device through signal detection coordinates of the detection sensor 940 for the display 930.

In operation 1650, the processor may adjust a size of a visual image displayed on the display 930. For example, the processor may adjust a size of a visual image displayed on the display 930 to correspond to a size of the display area.

Figure 17:
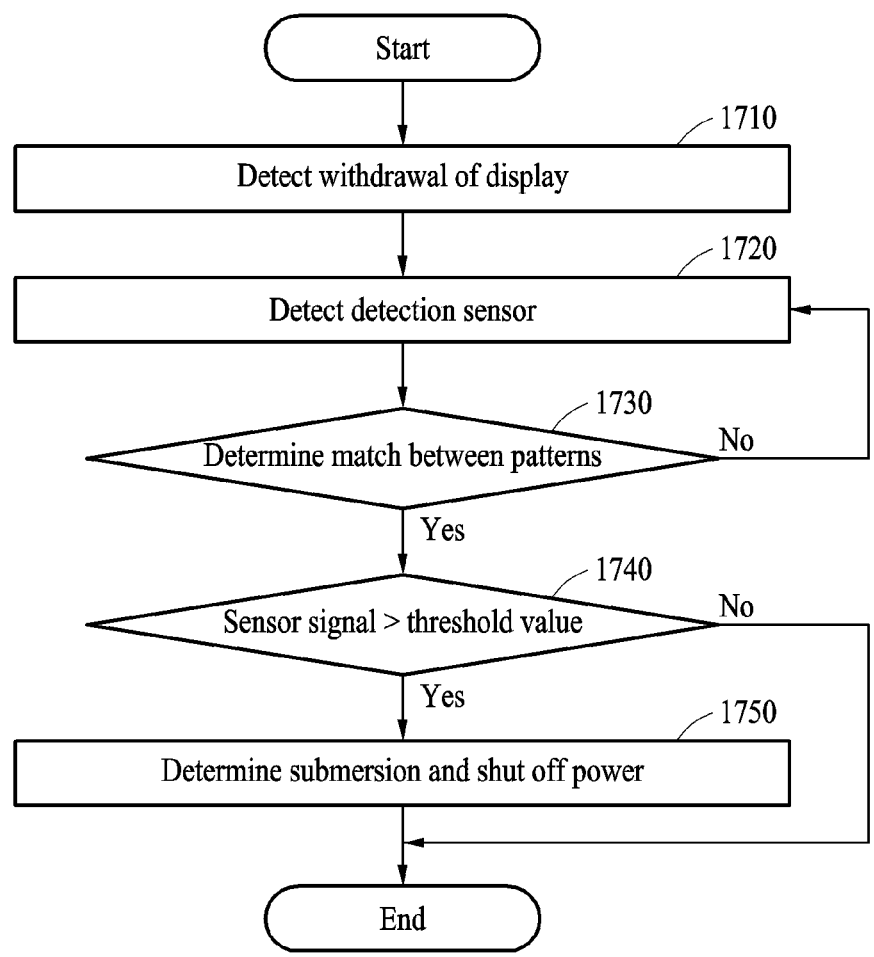
FIG. 17 is a flowchart illustrating an example operation of determining whether an electronic device is submerged, according to various embodiments.

FIG. 17 is a flowchart illustrating an example operation of determining whether an electronic device is submerged, according to various embodiments.

FIG. 17 illustrates an example of an operation of an electronic device (e.g., the electronic device 901 of FIG. 9) that performs determining whether the electronic device is submerged through signal detection of a detection sensor (e.g., the detection sensor 940 of FIG. 9).

In the following example embodiments, operations may be performed sequentially, but not necessarily performed sequentially. For example, the order of the operations illustrated in FIG. 17 may change, and at least two of the operations may be performed in parallel. In addition, each operation illustrated in FIG. 17 is not necessarily performed, and an example may be performed where at least one operation is excluded.

In an example embodiment, operations illustrated in FIG. 17 may be performed by at least one component (e.g., the processor 120 of FIG. 1) of the electronic device 901.

In operation 1710, a processor may detect an insertion and/or withdrawal operation of a display (e.g., the flexible display 930 of FIG. 9). For example, the processor may detect a moving operation performed by the display 930 that moves between the inside and the outside of the housing structure 900 through the outlet 902 in response to an expansion or contraction operation of the electronic device 901.

In operation 1720, the processor may detect the detection sensor 940. In an example embodiment, the detection sensor 940 may have self-capacitance, and the capacitance of the detection sensor 940 may change depending on a degree of moisture inflow. In an example embodiment, the processor may detect a signal pattern of the detection sensor 940, recognized through the display 930 or a separate detection sensor.

In operation 1730, the processor may determine whether a detected signal pattern is identical to the set signal pattern of the detection sensor 940. For example, signal pattern information of the detection sensor 940 may be stored in the memory, and the processor may determine whether a detected signal corresponds to the signal pattern of the detection sensor 940 by comparing the detected signal pattern to the stored signal pattern of the detection sensor 940.

In operation 1730, in case the processor 120 determines that a pattern of the electrical signal applied to the display 930 does not match the stored signal pattern of the detection sensor 940, the processor 120 may determine that the electrical signal applied to the display 930 is information due to misrecognition, and may recognize a electrical signal applied to the display 930 again.

In operation 1740, the processor may detect a signal value, that is, a capacitance value, applied by the detection sensor 940. In an example embodiment, the processor may compare the capacitance value applied by the detection sensor 940 with a threshold value. For example, since the capacitance value applied by the detection sensor 940 increases based on a degree of moisture inflow, the processor may determine a degree of water submersion by the electronic device 901 by comparing the signal value applied by the detection sensor 940 with the threshold value.

In operation 1750, the processor may determine whether the electronic device 901 is submerged. In an example embodiment, in case the electronic device 901 is determined to be submerged, the electronic device 901 may perform a corresponding operation, which is set corresponding to submersion of the electronic device 901. For example, the processor may perform a notification operation to notify submersion of the electronic device 901 to a user. The notification operation may be performed through, for example, vibration, sound, or a visual image. In an example embodiment, in case the processor determines that the electronic device 901 is submerged, the processor may shut off the power of the electronic device 901 or may shut off the power supplied to a main component inside the electronic device 901.

According to various example embodiments, the electronic device may include: the housing structure including a first housing and a second housing that movably coupled to the first housing in a moving direction; a flexible display wherein a size of the display area visible at a front surface of the housing structure is configured to vary based on a relative movement by the second housing with respect to the first housing; a detection sensor including a first electrode, a second electrode, and a dielectric disposed between the first electrode and the second electrode and configured to detect a change in the size of the display area; and the processor, wherein the housing structure may include an outlet, through which the flexible display is withdrawn from an internal space to the front surface or the flexible display is inserted into the internal space from the front surface, and the detection sensor may be disposed on the housing structure adjacent to the outlet such that the first electrode is facing the surface of the flexible display passing through the outlet, and the detection sensor may include a first portion having the length direction perpendicular to the moving direction, and one or more second portions protruding from the length direction to another direction.

In an example embodiment, the flexible display may be configured to detect capacitance generated by the detection sensor through a region passing through the outlet while the size of the display area is changing, and the processor may be configured to detect a change in the size of the display area through the region of the flexible display in which the capacitance generated by the detection sensor is detected.

In an example embodiment, the processor may be configured to adjust a size of the visual image displayed on the flexible display corresponding to the detected size of the display area.

In an example embodiment, the outlet may be formed to have a formation direction perpendicular to the moving direction, and the detection sensor may be disposed on the inner surface of the housing structure such that the length direction L is parallel with the formation direction of the outlet.

In an example embodiment, the detection sensor may be disposed such that the first portion is facing the front surface of the housing structure.

In an example embodiment, the electronic device may further include a grounded portion disposed in the internal space of the housing structure; a current carrying portion disposed on the inner surface of the housing structure and forming a grounding path by electrically connecting the detection sensor to the grounded portion.

In an example embodiment, the detection sensor may be attached to the outer surface of the first electrode, and may further include the sweeper contacting the surface of the flexible display passing through the outlet.

In an example embodiment, the capacitance of the detection sensor may be configured to change based on a degree of moisture inflow into the dielectric.

In an example embodiment, the electronic device may be electrically connected to the detection sensor, and may further include a detection sensor configured to detect a change in capacitance generated by the detection sensor.

In an example embodiment, the processor may be configured to compare the capacitance of the detection sensor with the a specified reference value, and based on the capacitance exceeding the reference value, may determine that the electronic device is submerged.

In an example embodiment, the processor may be configured to shut off power of the electronic device based on the electronic device being determined to be submerged.

In an example embodiment, the detection sensor may include a first detection sensor disposed to face the outlet; and a second detection sensor connected to the first detection sensor and disposed to relatively face the internal space compared to the first detection sensor. In an example embodiment, the processor may be configured to determine the degree of moisture inflow into the internal space through capacitances generated by the first detection sensor and the second detection sensor 1260 respectively.

In an example embodiment, the detection sensor may include an exposed region in which at least the portion of the second electrode is absent to expose the surface of the dielectric, and the exposed region may be formed on the second detection sensor.

In an example embodiment, the housing structure may further include a slot recess formed in the inner surface adjacent to the outlet, and the detection sensor may be seated on the slot.

According to various example embodiments, the electronic device may include: a first housing; a second housing at least partially overlapping the first housing, and movably coupled to the first housing in a moving direction; a flexible display at least a portion of which is mounted to a surface of the second housing and at least a portion is accommodated in an internal space formed by the first housing, and a size of the display area visible through the surfaces of the first housing and the second housing is configured to vary based on relative movement by the second housing with respect to the first housing; a detection sensor including a first electrode, a second electrode, and a dielectric disposed between the first electrode and the second electrode, wherein the capacitance is configured to change based on a degree of moisture inflow; and a processor, and wherein the first housing may include am outlet through which the flexible display is configured to be withdrawn from the internal space to the surface of the first housing and the second housing, or the flexible display is configured to be inserted into the internal space from the surface, the detection sensor is disposed on the inner surface of the first housing adjacent to the outlet, and the processor may be configured to determine the degree of moisture inflow into the internal space based on a change in the capacitance generated by the detection sensor.

In an example embodiment, the processor may be configured to compare the capacitance value generated by the detection sensor with a specified reference value, and based on the capacitance value exceeding the reference value, may determine that the electronic device is submerged.

In an example embodiment, the processor may be configured to shut off the power of the electronic device based on the electronic device being determined to be submerged.

In an example embodiment, the detection sensor may include the first detection sensor having a length direction parallel with the outlet; and a second detection sensor connected to the first detection sensor, disposed to face the internal space of the first housing based on the first detection sensor, and including the second portion protruding toward a direction perpendicular to the length direction.

According to various example embodiments, a method of controlling a display screen of a slideable electronic device may include: detecting an insertion or withdrawal operation of the display through an outlet; detecting a detection sensor through the display; determining whether a detected pattern of the detection sensor matches a preset pattern of the detection sensor determining a detection sensor detecting region of the display based pm the detected pattern of the detection sensor matching a specified pattern of the detection sensor; calculating a size of the display area of the display visible to the outside through the determined detecting region of the detection sensor of the display; and displaying visual information on the display corresponding to the calculated size of the display area.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing structure comprising a first housing and a second housing movably coupled to the first housing in a moving direction;
a flexible display supported by the first housing and the second housing, wherein a size of a display area visible at a front surface of the housing structure is configured to change based on relative movement of the second housing with respect to the first housing;
a detection sensor comprising a first electrode and a second electrode disposed side by side, and a dielectric disposed between the first electrode and the second electrode, and configured to detect a change in the size of the display area; and
a processor,
wherein the housing structure comprises an outlet, through which the flexible display is configured to be withdrawn from an internal space to the front surface of the housing structure or in which the flexible display is configured to be inserted from the front surface to the internal space, on the front surface of the housing structure,
the detection sensor is disposed on a part of the housing structure adjacent to the outlet, such that the first electrode faces a surface of the flexible display passing through the outlet, and
the detection sensor comprises a first portion having a length direction, and one or more second portions protruding from the first portion to another direction.

2. The electronic device of claim 1, wherein, based on changing the display area, the flexible display is configured to detect capacitance generated by the detection sensor through a region passing through the outlet, and the processor is configured to detect a change in the size of the display area through a region of the flexible display, in which the capacitance generated by the detection sensor is detected.

3. The electronic device of claim 2, wherein the processor is further configured to adjust a size of a visual image displayed on the flexible display to correspond to the detected size of the display area.

4. The electronic device of claim 1, wherein the outlet has a formation direction perpendicular to the moving direction, and
the detection sensor is disposed on an inner surface of the housing structure such that the length direction is parallel with the formation direction of the outlet.

5. The electronic device of claim 4, wherein the detection sensor is disposed such that the first portion faces the front surface of the housing structure.

6. The electronic device of claim 1, further comprising:
a grounded portion disposed in the internal space of the housing structure; and
a current carrying portion disposed on an inner surface of the housing structure and configured to form a ground path by connecting the detection sensor to the grounded portion.

7. The electronic device of claim 1, further comprising:
a sweeper attached to an outer surface of the detection sensor and contacting a surface of the flexible display passing through the outlet.

8. The electronic device of claim 1, wherein a capacitance of the detection sensor is configured to change based on a degree of moisture inflow into the dielectric.

9. The electronic device of claim 8, further comprising:
a detector electrically connected to the detection sensor and configured to detect a change in the capacitance generated by the detection sensor.

10. The electronic device of claim 8, wherein the processor is configured to compare the capacitance of the detection sensor with a specified reference value, and based on the capacitance of the detection sensor exceeding the specified reference value, determine that the electronic device is submerged.

11. The electronic device of claim 10, wherein the processor is further configured to, based on the electronic device being determined to be submerged, shut off power of the electronic device.

12. The electronic device of claim 8, wherein the detection sensor further comprises:
a first detection sensor disposed to face the outlet; and
a second detection sensor connected to the first detection sensor, and disposed relatively facing the internal space, compared to the first detection sensor.

13. The electronic device of claim 12, wherein the processor is further configured to determine the degree of moisture inflow into the internal space based on capacitances generated by the first detection sensor and the second detection sensor, respectively.

14. The electronic device of claim 12, wherein the detection sensor further comprises an exposed region in which at least a portion of the first electrode is absent to expose a surface of the dielectric, and
the exposed region is formed on the second detection sensor.

15. The electronic device of claim 1, wherein the housing structure further comprises a slot recess formed in an inner surface part of the housing structure, adjacent to the outlet, and
the detection sensor is seated on the slot.

16. An electronic device comprising:
a first housing;
a second housing partially overlapping the first housing, and movably coupled to the first housing in a moving direction;
a flexible display, at least a portion of which is mounted to a surface of the second housing, at least another portion is accommodated in an internal space formed by the first housing, and a size of a display area visible through surfaces of the first housing and the second housing is configured to change based on relative movement of the second housing with respect to the first housing;
a detection sensor having a capacitance configured to change based on a degree of moisture inflow, and comprising a first electrode, a second electrode, and a dielectric disposed between the first electrode and the second electrode; and
a processor,
and wherein the first housing comprises an outlet through which the flexible display is configured to be withdrawn from the internal space to the surface of the first housing and the second housing, or the flexible display is configured to be inserted to the internal space from the surface,
the detection sensor is disposed on an inner surface of the first housing adjacent to the outlet, and
the processor is configured to determine the degree of moisture inflow into the internal space based on a change of a capacitance value generated by the detection sensor.

17. The electronic device of claim 16, wherein the processor is further configured to compare the capacitance value generated by the detection sensor, with a specified reference value, and based on the capacitance value exceeding the reference value, determine that the electronic device is submerged.

18. The electronic device of claim 17, wherein the processor is further configured to shut off power of the electronic device based on the electronic device being determined to be submerged.

19. The electronic device of claim 16, wherein the detection sensor comprises:
a first detection sensor having a length direction parallel with the outlet; and
a second detection sensor connected to the first detection sensor, disposed to face the internal space of the first housing based on the first detection sensor, and comprising a second portion protruding in a direction perpendicular to the length direction.

20. A method of controlling a display screen of an electronic device, the method comprising:
detecting insertion or withdrawal of a display through an outlet;
detecting a detection sensor through the display;
determining whether a detected pattern of the detection sensor matches a specified pattern of the detection sensor;
based on the detected pattern of the detection sensor matching the specified pattern of the detection sensor, identifying an area in which the detection sensor is detected on the display;
calculating a size of a display area of the display visible to the outside based on the identified detection sensor detecting area of the display; and displaying visual information corresponding to the calculated size of the display area of the display.

* * * * *